(12) United States Patent
Lin et al.

(10) Patent No.: US 12,476,829 B2
(45) Date of Patent: Nov. 18, 2025

(54) SECURE STARTUP METHOD, CONTROLLER, AND CONTROL SYSTEM

(71) Applicant: Shenzhen Yinwang Intelligent Technologies Co., Ltd., Shenzhen (CN)

(72) Inventors: Hsiao-Ying Lin, Singapore (SG); Girish Shivalingappa Revadigar, Singapore (SG)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 355 days.

(21) Appl. No.: 17/575,428

(22) Filed: Jan. 13, 2022

(65) Prior Publication Data
US 2022/0182248 A1 Jun. 9, 2022

Related U.S. Application Data

(63) Continuation of application No. PCT/CN2020/075743, filed on Feb. 18, 2020.

(30) Foreign Application Priority Data

Aug. 6, 2019 (CN) .......................... 201910721190.9

(51) Int. Cl.
*H04L 9/32* (2006.01)
*G06F 21/57* (2013.01)
(Continued)

(52) U.S. Cl.
CPC .......... *H04L 9/3271* (2013.01); *G06F 21/575* (2013.01); *G06F 21/606* (2013.01);
(Continued)

(58) Field of Classification Search
None
See application file for complete search history.

(56) References Cited

U.S. PATENT DOCUMENTS 8,239,686 B1 * 8/2012 Hodzic ................... G06F 21/52
713/187
8,856,538 B2 10/2014 Costin et al.
(Continued)

FOREIGN PATENT DOCUMENTS

CN 102819706 A 12/2012
CN 106295318 A 1/2017
(Continued)

*Primary Examiner* — Lance Leonard Barry
(74) *Attorney, Agent, or Firm* — Leydig, Voit & Mayer, Ltd.

(57) ABSTRACT

A secure startup method and apparatus are disclosed. The method includes: sending startup information to an auxiliary controller, where the auxiliary controller includes a secure storage unit that stores first public key information and the secure storage unit has a tamper resistance function. The first public key information authenticates a target controller and the startup information triggers the auxiliary controller to authenticate a first program of the target controller. The target controller receives challenge information sent by the auxiliary controller, obtains response information based on the challenge information, sends the response information to the auxiliary controller, and starts the target controller securely through cooperation between the auxiliary controller and the target controller.

12 Claims, 11 Drawing Sheets

(51) Int. Cl.
*G06F 21/60* (2013.01)
*H04L 9/00* (2022.01)
*H04L 9/40* (2022.01)

(52) U.S. Cl.
CPC ............ *H04L 9/006* (2013.01); *H04L 9/3236* (2013.01); *H04L 9/3247* (2013.01); *H04L 63/0428* (2013.01)

(56) References Cited

U.S. PATENT DOCUMENTS

| | | | |
|---|---|---|---|
| 8,984,265 B2* | 3/2015 | Vaid | G06F 21/575 |
| | | | 713/2 |
| 9,792,440 B1* | 10/2017 | Wang | H04L 63/1466 |
| 10,778,450 B1* | 9/2020 | Griffin | H04L 9/0844 |
| 2008/0165952 A1 | 7/2008 | Smith et al. | |
| 2008/0307226 A1* | 12/2008 | Chow | H04L 63/126 |
| | | | 709/206 |
| 2011/0258426 A1 | 10/2011 | Mujtaba et al. | |
| 2014/0020083 A1* | 1/2014 | Fetik | G06F 21/78 |
| | | | 726/11 |
| 2015/0012737 A1 | 1/2015 | Newell | |
| 2017/0147356 A1 | 5/2017 | Kotary et al. | |
| 2017/0235956 A1 | 8/2017 | Maletsky | |
| 2018/0010566 A1* | 1/2018 | Barassi | F02N 19/001 |
| 2019/0372781 A1* | 12/2019 | Ra | H04L 9/3239 |
| 2020/0342109 A1* | 10/2020 | Wright | G06F 3/065 |
| 2021/0243040 A1* | 8/2021 | Lu | G06F 16/245 |
| 2022/0182248 A1* | 6/2022 | Lin | H04L 63/0442 |

FOREIGN PATENT DOCUMENTS

| | | | | |
|---|---|---|---|---|
| CN | 107220547 A | 9/2017 | | |
| CN | 107729743 A | 2/2018 | | |
| CN | 108027861 A | 5/2018 | | |
| CN | 108399339 A | 8/2018 | | |
| CN | 108595982 A | 9/2018 | | |
| EP | 1519536 A2 * | 3/2005 | ............ | H04L 63/06 |
| EP | 3416082 A1 * | 12/2018 | ............ | G06F 21/51 |
| JP | 2018047908 A * | 3/2018 | | |
| KR | 20180092596 A | 8/2018 | | |
| WO | WO-2013138757 A1 * | 9/2013 | ........... | G06Q 20/108 |
| WO | WO-2014153728 A1 * | 10/2014 | ........... | H04L 9/0816 |

* cited by examiner

SECURE STARTUP METHOD, CONTROLLER, AND CONTROL SYSTEM

CROSS-REFERENCE TO RELATED APPLICATIONS

This application is a continuation of International Application No. PCT/CN2020/075743, filed on Feb. 18, 2020, which claims priority to Chinese Patent Application No. 201910721190.9, filed on Aug. 6, 2019. The disclosures of the aforementioned applications are hereby incorporated by reference in their entireties.

TECHNICAL FIELD

The embodiments relate to the communications field, a secure startup method, a controller, and a control system.

BACKGROUND

Many vehicle-mounted controllers are installed in modern vehicles such as a car and a bus. Many vehicle-mounted controllers are connected to each other in a wired manner by using an internal local area network bus for communication, to send and receive a control message and system data, so that the driver controls the vehicle. If the vehicle-mounted controller is illegally attacked or tampered with, the entire vehicle is not controlled by a driver. Consequently, traffic accidents are very likely to occur. Therefore, system security of the vehicle-mounted controller is a priority to provide security for the entire vehicle.

In the prior art, to ensure system security of the vehicle-mounted controller, security hardware is added to the vehicle-mounted controller to store a key of a system of the vehicle-mounted controller, and stored content cannot be tampered. If the system of the vehicle-mounted controller is illegally attacked or tampered, when security verification is performed on the system after the vehicle-mounted controller is started, a key generated by the system that is illegally attacked or tampered is different from the key stored in the security hardware, and in this case, the vehicle-mounted controller is not normally started. In this method, it is ensured that the vehicle-mounted controller is securely started.

However, in reality, it is difficult to install the security hardware in each vehicle-mounted controller. In addition, even if the security hardware is added to each vehicle-mounted controller, costs of the entire vehicle increase.

SUMMARY

To overcome the foregoing problem, embodiments provide a secure startup method, a controller, and a control system, to enable, by using a challenge-response protocol and by using a secure storage unit in an auxiliary controller, a target controller that does not have the secure storage unit to be securely started based on a hardware root of trust.

To achieve the foregoing objective, the following technical solutions are used in the embodiments.

According to a first aspect, a secure startup method is performed by a target controller and includes: sending startup information to an auxiliary controller, where the auxiliary controller includes a secure storage unit that stores first public key information, the secure storage unit has a tamper resistance function, the first public key information is used to authenticate the target controller, and the startup information is used to trigger the auxiliary controller to authenticate a first program of the target controller; receiving challenge information sent by the auxiliary controller, and obtaining response information based on the challenge information, where the response information includes first information and second information; and sending the response information to the auxiliary controller. The target controller securely communicates, based on a public key system and by using a challenge-response protocol, with the auxiliary controller that has the secure storage unit, thereby implementing secure startup based on a hardware root of trust.

In another possible implementation, the method further includes: receiving running information sent by the auxiliary controller, where the running information is used to notify the target controller whether the second information is verified; and running the first program, where the first program includes a boot code control program and/or a system control program. By using the running information, the target controller can determine whether secure startup is completed, to reach a secure startup state.

In another possible implementation, the obtaining response information based on the challenge information, where the response information includes first information and second information includes: when the challenge information is C, obtaining an image hash value of the first program based on C, and raising the obtained image hash value to a $C^{th}$ power modulo N to obtain the first information; and when the target controller stores a signature value of the image hash value of the first program, raising the signature value to a $C^{th}$ power modulo N to obtain the second information, where C and N are positive integers.

In another possible implementation, the target controller stores a communication key, and the method further includes: in a process of communicating with the auxiliary controller, encrypting, by using the communication key, at least one of the startup information and the response information that are sent by the target controller, and decrypting, by using the communication key, at least one of the challenge information and the running information that are received by the target controller. In a communication process between the target controller and the auxiliary controller, the target controller uses, through secure communication, a common key to encrypt content sent in the communication process and decrypt content received in the communication process, thereby ensuring security and confidentiality of information transmission in the communication process.

According to a second aspect, a secure startup method is performed by an auxiliary controller, the auxiliary controller includes a secure storage unit that stores first public key information, the secure storage unit has a tamper resistance function, the first public key information is used to authenticate a target controller, and the method includes: receiving startup information sent by the target controller, where the startup information is used to trigger the auxiliary controller to authenticate a first program of the target controller; sending challenge information to the target controller; and receiving response information sent by the target controller, where the response information includes the first information and the second information. The auxiliary controller securely communicates, based on a public key system and by using a challenge-response protocol, with the target controller that does not have the secure storage unit, thereby implementing secure startup based on a hardware root of trust.

In another possible implementation, the method further includes: sending running information to the target controller, where the running information is used to notify the target controller whether the second information is verified.

In another possible implementation, the sending running information to the target controller includes: obtaining a hash value after raising the first information to a (first public key information)$^{th}$ power modulo N; and sending the running information to the target controller when the hash value is the same as the second information.

In another possible implementation, the response information further includes second public key information, and the method further includes: verifying whether the first public key information is the same as the second public key information; and verifying the second information when the first public key information is the same as the second public key information. The auxiliary controller performs verification by using the public key system. The secure storage unit pre-stores public key information of the target controller, and then verifies security of the target controller by comparing public key information in an image file of the target controller with the public key information stored in the secure storage unit, thereby ensuring security of information transmission in a communication process.

In another possible implementation, the secure storage unit further stores a communication key, and the method further includes: in a process of communicating with the target controller, encrypting, by using the communication key, at least one of the challenge information and the running information that are sent by the auxiliary controller, and decrypting, by using the communication key, at least one of the startup information and the response information that are received by the auxiliary controller. In a communication process between the target controller and the auxiliary controller, the auxiliary controller uses, through secure communication, a common key to encrypt content sent in the communication process and decrypt content received in the communication process, thereby ensuring security and confidentiality of information transmission in the communication process.

According to a third aspect, a secure startup method is performed by a target controller, and the method includes: sending startup information to an auxiliary controller, where the auxiliary controller includes a secure storage unit that stores first key information, the secure storage unit has a tamper resistance function, and the startup information is used to trigger the auxiliary controller to authenticate a first program of the target controller; receiving challenge information sent by the auxiliary controller, and generating response information based on the challenge information; and sending the response information to the auxiliary controller. The target controller securely communicates, based on a key system and by using a challenge-response protocol, with the auxiliary controller that has the secure storage unit, thereby implementing secure startup based on a hardware root of trust.

In another possible implementation, the method further includes: receiving running information sent by the auxiliary controller, where the running information is used to notify the target controller whether the response information is verified; and running the first program, where the first program includes a boot code control program and/or a system control program. By using the running information, the target controller can determine whether secure startup is completed, to reach a secure startup state.

In another possible implementation, the generating response information based on the challenge information includes: hashing the challenge information and an image of the first program to obtain the response information.

In another possible implementation, the target controller stores a communication key, and the method further includes: in a process of communicating with the auxiliary controller, encrypting, by using the communication key, at least one of the startup information and the response information that are sent by the target controller, and decrypting, by using the communication key, at least one of the challenge information and the running information that are received by the target controller. In a communication process between the target controller and the auxiliary controller, the target controller uses, through secure communication, a common key to encrypt content sent in the communication process and decrypt content received in the communication process, thereby ensuring security and confidentiality of information transmission in the communication process.

According to a fourth aspect, a secure startup method is performed by an auxiliary controller, the auxiliary controller includes a secure storage unit that stores first key information, the secure storage unit has a tamper resistance function, the first key information is used to authenticate a target controller, and the method includes: receiving startup information sent by the target controller, where the startup information is used to trigger the auxiliary controller to authenticate a first program of the target controller; sending challenge information to the target controller; and receiving the response information sent by the target controller. The auxiliary controller securely communicates, based on a key system and by using a challenge-response protocol, with the target controller that does not have the secure storage unit, thereby implementing secure startup based on a hardware root of trust.

In another possible implementation, the method further includes: sending running information to the target controller, where the running information is used to notify the target controller whether the response information is verified.

In another possible implementation, the secure storage unit further stores the first program of the target controller, and the sending running information to the target controller includes: hashing the first key information and the response information to obtain a hash value; sending the running information to the target controller when the hash value is the same as an original hash value of the first program corresponding to the challenge information, where the original hash value is obtained by hashing the challenge information and the first program and then hashing an obtained hash value and the first key information. The auxiliary controller performs verification by using the key system. The secure storage unit pre-stores key information of the target controller, and then verifies security of the target controller by comparing the signature value with a value obtained after hashing the hash value sent by the target controller, thereby ensuring security of information transmission in a communication process.

In another possible implementation, the secure storage unit further stores a communication key, and the method further includes: in a process of communicating with the target controller, encrypting, by using the communication key, at least one of the challenge information and the running information that are sent by the auxiliary controller, and decrypting, by using the communication key, at least one of the startup information and the response information that are received by the auxiliary controller. In a communication process between the target controller and the auxiliary controller, the auxiliary controller uses, through secure communication, a common key to encrypt content sent in the communication process and decrypt content received in the communication process, thereby ensuring security and confidentiality of information transmission in the communication process.

According to a fifth aspect, a target controller has a function of implementing behavior in the method instance in the first aspect. The function may be implemented by using hardware or may be implemented by executing corresponding software by using hardware. The hardware or the software includes one or more modules corresponding to the foregoing function. In a possible implementation, a structure of the target controller includes a sending unit, a receiving unit, and a processing unit, and may further include a storage unit, and the units may perform corresponding functions in the exemplary method of the first aspect.

According to a sixth aspect, an auxiliary controller has a function of implementing behavior in the method instance in the second aspect. The function may be implemented by using hardware, or may be implemented by executing corresponding software by using hardware. The hardware or the software includes one or more modules corresponding to the foregoing function. In a possible implementation, a structure of the auxiliary controller includes a secure storage unit, a receiving unit, a sending unit, and a processing unit, and the units may perform corresponding functions in the exemplary method of the second aspect.

According to a seventh aspect, a target controller has a function of implementing behavior in the method instance in the third aspect. The function may be implemented by using hardware, or may be implemented by executing corresponding software by using hardware. The hardware or the software includes one or more modules corresponding to the foregoing function. In a possible implementation, a structure of the target controller includes a sending unit, a receiving unit, and a processing unit, and may further include a storage unit, and the units may perform corresponding functions in the exemplary method of the third aspect.

According to an eighth aspect, an auxiliary controller has a function of implementing behavior in the method instance in the fourth aspect. The function may be implemented by using hardware, or may be implemented by executing corresponding software by using hardware. The hardware or the software includes one or more modules corresponding to the foregoing function. In a possible implementation, a structure of the auxiliary controller includes a secure storage unit, a receiving unit, a sending unit, and a processing unit, and the units may perform corresponding functions in the exemplary method of the fourth aspect.

According to a ninth aspect, a control system includes the target controller of the fifth aspect and the auxiliary controller of the seventh aspect.

According to a tenth aspect, a control system includes the target controller of the sixth aspect and the auxiliary controller of the eighth aspect.

According to an eleventh aspect, a vehicle-mounted device includes the control system of the ninth aspect, where the target controller is connected to the auxiliary controller by using an entity bus.

According to a twelfth aspect, a vehicle-mounted device, includes the control system of the tenth aspect, where the target controller is connected to the auxiliary controller by using an entity bus.

According to a thirteenth aspect, a non-transitory machine-readable storage medium is configured to store instructions, or transmit the instructions to another non-transitory machine-readable storage medium. When the instructions are executed, any possible embodiment in the first aspect or in the second aspect is implemented.

According to a fourteenth aspect, a non-transitory machine readable storage medium is configured to store instructions, or transmit the instructions to another readable storage medium. When the instructions are executed, any possible embodiment in the second aspect or the fourth aspect is implemented.

According to a fifteenth aspect, a communications apparatus includes a transceiver, a processor, and a memory, where the memory stores one or more programs, the one or more programs include instructions, and when the instructions are executed by the apparatus, the apparatus is enabled to perform any possible embodiment in the first aspect or the third aspect.

According to a sixteenth aspect, a communications apparatus includes a transceiver, a processor, and a memory, where the memory stores one or more programs, the one or more programs include instructions, and when the instructions are executed by the apparatus, the apparatus is enabled to perform any possible embodiment in the second aspect or the fourth aspect.

BRIEF DESCRIPTION OF DRAWINGS

The following briefly describes the accompanying drawings required for describing the embodiments.

DETAILED DESCRIPTION OF THE EMBODIMENTS

The following describes the solutions in the embodiments with reference to the accompanying drawings.

It should be preferably noted that a vehicle-mounted controller is used as an example to describe the solutions. It may be learned by a person skilled in the art that the solutions are not limited to a vehicle-mounted controller in a vehicle-mounted system, and may be further adapted to a controller of another device.

Figure 1:
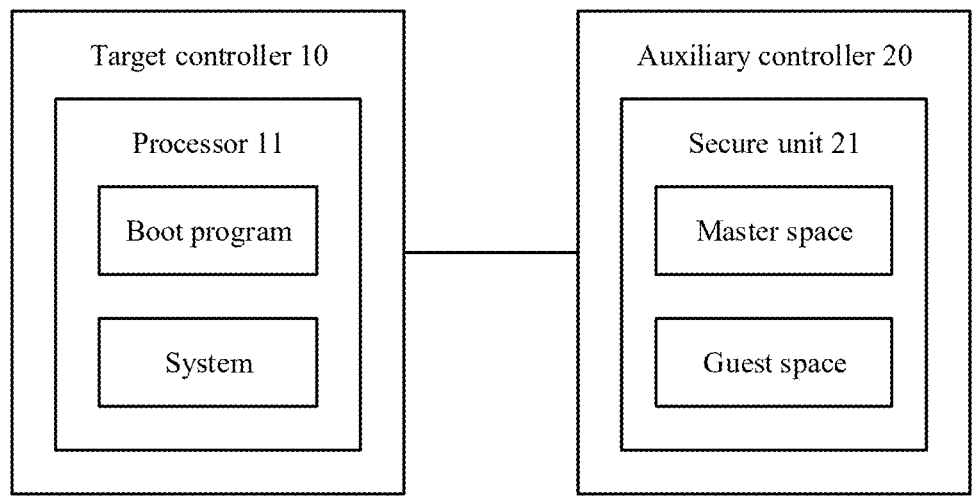
FIG. 1 is a schematic structural diagram of a control system according to an embodiment.

FIG. 1 is a schematic structural diagram of a control system according to an embodiment. As shown in FIG. 1, the system includes a target controller 10 and an auxiliary controller 20. The target controller 10 is connected to the auxiliary controller 20 by an entity bus, to implement communication with each other.

The target controller 10 is a controller on which another controller needs to perform security verification in a secure startup process of a vehicle. The target controller 10 includes a processor 11. The processor 11 includes a boot chip (BootROM), a boot code (BootCode) control program, and a system control program. The boot chip starts a boot program (Bootloader) by verifying source credibility and integrity of a boot code control program of the boot program, and the boot program starts a system control program by verifying source credibility and integrity of the system control program.

The auxiliary controller 20 is a controller configured to assist a controller that does not have the secure storage unit in performing security verification, and further includes a secure storage unit 21 relative to the target controller 10.

The secure storage unit 21 is used for secure hardware having function construction such as secure storage, real random number generation, and password algorithm acceleration. A secure storage function is a main function of implementing secure startup of a controller. In an embodiment, a mobile phone is used as an example. A chip of the mobile phone has a storage area that cannot be tampered with, and a public key (Public key) is written before delivery. After delivery, when the mobile phone is powered on, the public key is used to verify hardware and software in a startup program. A source of such "security" is trust in the public key written in the storage area that cannot be tampered with. This is a root of trust (Root of Trust). If the root of trust is based on hardware, it is referred to as a hardware root of trust (Hardware Root of Trust). If the root of trust is based on software, it is referred to as a software root of trust (Software Root of Trust). A difficulty of a hardware attack is generally higher than a difficulty of a software attack. Therefore, the hardware root of trust can achieve relatively high security.

Storage space of the secure storage unit 21 is generally divided into two parts: master space and guest space. The master space is used to store information used for verification during secure startup of the auxiliary controller 20, and the guest space is used to store information used for verification during secure startup of the target controller 10 that is connected to the auxiliary controller 20 in a wired manner. In a startup process of the target controller 10, when the processor 11 needs to verify source credibility and integrity of the boot program, the processor 11 determines, through comparison by using a challenge-response protocol (challenge-response) with the auxiliary controller 20, whether public key information stored in the secure storage unit 21 in the auxiliary controller 20 is the same as public key information in the boot program (Bootloader). When the boot program needs to verify source credibility and integrity of the system, the boot program determines, through comparison by using the challenge-response protocol with the auxiliary controller 20, whether the public key information stored in the secure storage unit 21 in the auxiliary controller 20 is the same as public key information in the system (System).

In this embodiment, the secure storage unit 21 in the auxiliary controller 20 is used, so that the target controller 10 is securely started based on a hardware root of trust through cooperation between the auxiliary controller 20 and the target controller 10.

A scenario to which a vehicle-mounted system provided in an embodiment is applied may be as follows: A vehicle-mounted central gateway with a secure storage unit 21 is used as an auxiliary controller 20, and another controller connected to the vehicle-mounted central gateway in a wired manner may be used as a target controller 10; in each functional domain, a domain controller with a secure storage unit 21 is used as an auxiliary controller 20, and another controller used for assistance in the functional domain is used as a target controller 10; a power management controller with security hardware is used as an auxiliary controller 20, and a plurality of electrochemical cell controllers that assist the power management controller with management are used as target controllers 10; and the like.

In the following embodiment, in a process of verifying the target controller 10, the auxiliary controller 20 performs verification based on a public key system, in other words, there is public key information in an image file of the target controller 10, a secure storage unit 21 in the auxiliary controller 20 pre-stores public key information of the target controller 10, and then security of the target controller 10 is verified by comparing the public key information in the image file of the target controller 10 with the public key information stored in the secure storage unit 21. It may be learned by a person skilled in the art that a verification method is not limited to the method mentioned in the embodiments, and may be another method that can verify the security of the target controller 10.

Figure 2:
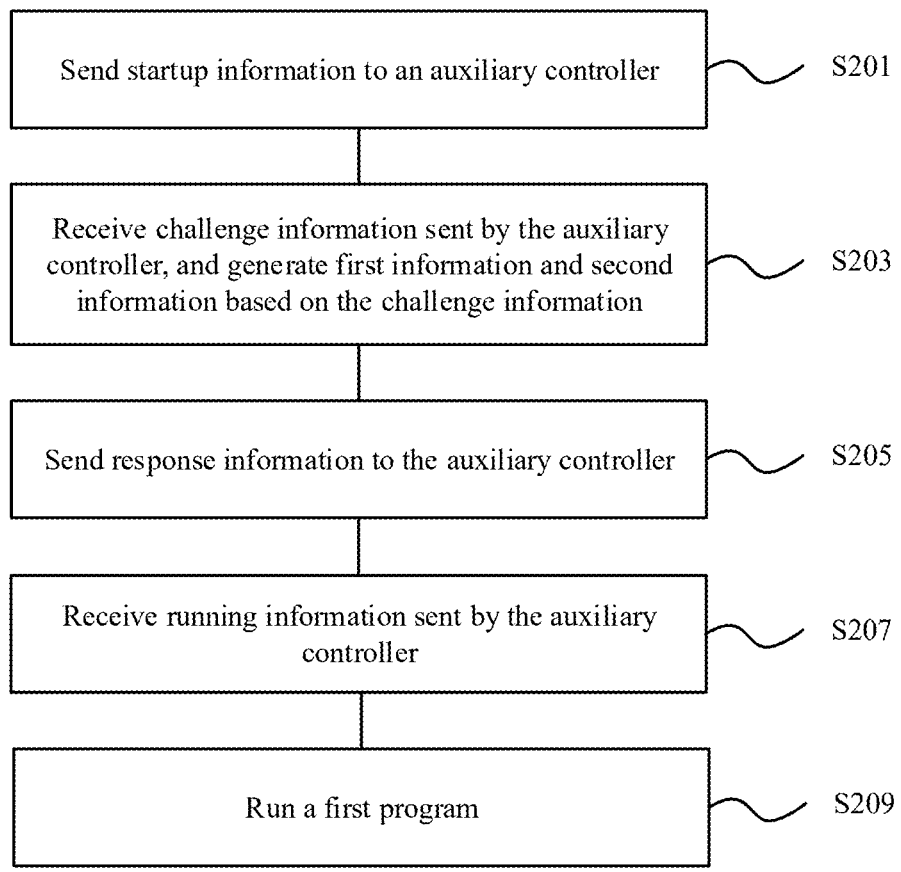
FIG. 2 is a schematic flowchart of a first secure startup method according to an embodiment.

FIG. 2 is a schematic flowchart of a first secure startup method according to an embodiment. As shown in FIG. 2, a secure startup method is performed by a target controller. An exemplary implementation process is as follows:

Step S201: Send startup information to an auxiliary controller 20.

Before the target controller 10 sends the startup information, the auxiliary controller 20 has already worked normally.

The startup information is a secure startup program that is used to trigger the auxiliary controller 20 to participate in authentication of a boot code control program and/or a system control program of the target controller 10.

In this embodiment, the target controller 10 does not have a secure storage unit, the auxiliary controller 20 has a secure storage unit 21, and the secure storage unit 21 of the auxiliary controller 20 stores first public key information used to authenticate the target controller 10.

Step S203: Receive challenge information sent by the auxiliary controller 20, and generate first information and second information based on the challenge information.

After receiving the challenge information sent by the auxiliary controller 20, the boot code control program of the target controller 10 calculates a first image hash value and a first image signature value of an image of the boot code control program. After receiving the challenge information sent by the auxiliary controller 20, the system control program of the target controller 10 calculates a second image hash value and a second image signature value of an image of the system control program. The first information is a hash value of the image of the boot code control program and/or a hash value of the image of the system control program, and the second information is a signature value of the first information.

In a possible case, the first image hash value is obtained by hashing the image of the boot code control program and then raising an obtained image hash value to a $C^{th}$ power modulo N; the first image signature value is obtained by signing the hash value of the image that is of the boot code control program and that is stored in the target controller 10, and then raising an obtained image signature value to a $C^{th}$ power modulo N; the second image hash value is obtained by hashing the image of the system control program, and then raising an obtained image hash value to a $C^{th}$ power modulo N; and the second image signature value is signing the hash value of the image that is of the system control program and that is stored in the target controller 10, and then raising an obtained image signature value to a $C^{th}$ power modulo N. C and N are positive integers.

Step S205: Send response information to the auxiliary controller 20.

The response information includes the first information and the second information. In other words, the response information includes the first image hash value and/or the second image hash value, and the first image signature value and/or the second image signature value.

Step S207: Receive running information sent by the auxiliary controller 20. The running information is generated when the auxiliary controller 20 verifies the second information by using the first public key information and the first information. A function of the running information is to notify the target controller 10 whether the second information is verified.

In a possible embodiment, the response information further includes second public key information stored in the target controller 10, and the second public key information is compared with the first public key information in the secure storage unit 21. The auxiliary controller 20 verifies the second information when the first public key information is the same as the second public key information.

Step 209: Run a first program.

The first program includes the boot code control program and/or the system control program.

In a possible embodiment, the target controller 10 stores a communication key, and is configured to: in a process of communicating with the auxiliary controller 20, encrypt, by using the communication key, at least one of the startup information and the response information that are sent by the target controller 10, and decrypt, by using the communication key, at least one of the challenge information and the running information that are received by the target controller 10, to ensure security and confidentiality of information in the communication process.

In a communication process between the target controller 10 and the auxiliary controller 20, after receiving the challenge information sent by the auxiliary controller 20, the target controller 10 sends the response information (response) to the auxiliary controller 20. The auxiliary controller 20 verifies source credibility and integrity of a boot program (Bootloader) and a system (System) in a startup process of the target controller 10 by using public key information, image hash values, and image signature values that are of the boot program and the system and that are in the response information, a challenge-response protocol, and the public key information that is stored in the secure storage unit 21. The target controller 10 can enter a normal working state only when the auxiliary controller 20 verifies the source credibility and the integrity of the boot program and the system of the target controller 10.

The target controller 10 performs, based on a public key system and by using the challenge-response protocol, secure communication with the auxiliary controller 20 that has the secure storage unit 21.

Figure 3:
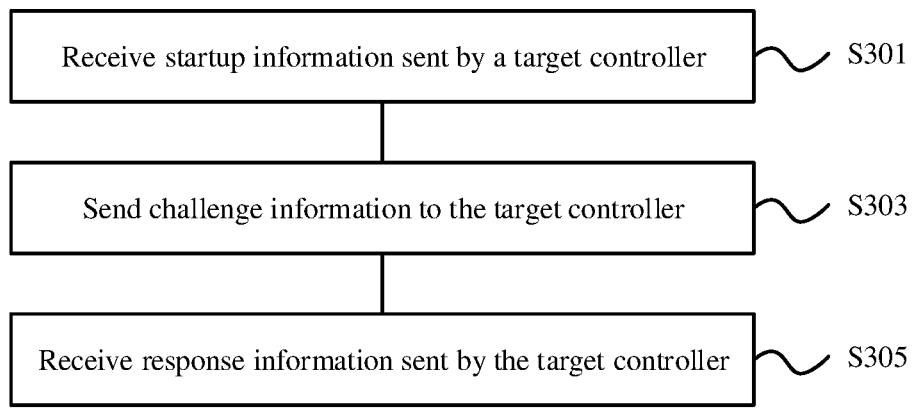
FIG. 3 is a schematic flowchart of a second secure startup method according to an embodiment.

FIG. 3 is a schematic flowchart of a second secure startup method according to an embodiment. As shown in FIG. 3, an embodiment provides a secure startup method. The method is performed by an auxiliary controller 20. An exemplary implementation process is as follows:

Step S301: Receive startup information sent by a target controller 10.

The startup information is used to trigger to authenticate a first program of the target controller 10.

After being powered on, the target controller 10 enters a boot code control program, and sends, to the auxiliary controller 20, the startup information that is used to start the auxiliary controller 20 to verify security of the target controller 10, so that the auxiliary controller 20 enters an auxiliary secure startup program.

Step S303: Send challenge information to the target controller 10.

The challenge information is used to enable the target controller 10 to generate first information and second information. The first information is a hash value of an image of the boot code control program and/or a hash value of an image of a system control program, and the second information is a signature value of the first information.

In a possible case, the boot code control program in the target controller 10 receives the challenge information, and first response information sent by the target controller 10 includes a first image hash value and a first image signature value. The first image hash value is obtained by hashing the image of the boot code control program, and then raising an obtained image hash value to a $C^h$ power modulo N. The first image signature value is obtained by signing a hash value of the image that is of the boot code control program and that is stored in the target controller 10, and then raising an obtained image signature value to a $C^h$ power modulo N.

The system control program in the target controller 10 receives the challenge information, and second response information sent by the target controller 10 includes a second image hash value and a second image signature value. The second image hash value is obtained by hashing the image of the system control program, and then raising an obtained image hash value to a $C^{th}$ power modulo N. The second image signature value is obtained by signing a hash value of the image of the system control program stored in the target controller 10, and then raising an obtained image signature value to a $C^{th}$ power modulo N.

Step S305: Receive response information sent by the target controller 10.

The response information includes the first information and the second information, the first information includes the first image hash value and/or the second image hash value, and the second information includes the first image signature value and/or the second image signature value.

Step S307: Send running information to the target controller 10.

The running information is generated when the auxiliary controller 20 verifies the second information by using first public key information and the first information. A function of the running information is to notify the target controller 10 whether the second information is verified.

In a possible embodiment, a hash value obtained after the first image hash value is raised to a (first public key information)' power modulo N is compared with the first image signature value, and second challenge information is sent to the target controller 10 after the hash value is the same as the first image signature value; and a hash value obtained after the second image hash value is raised to a (first public key information)$^{th}$ power modulo N is compared with the second image signature value, and the running information is sent to the target controller 10 after the hash value is the same as the second image signature value.

In a possible embodiment, the response information further includes second public key information stored in the target controller 10. The auxiliary controller 20 verifies whether the first public key information is the same as the second public key information, and then verifies the second information by using the first public key information and the first information when the first public key information is the same as the second public key information.

In a possible embodiment, the secure storage unit 21 further stores a communication key, and is configured to: in a process of communicating with the target controller 10, encrypt, by using the communication key, at least one of the challenge information and the running information that are sent by the auxiliary controller 20, and decrypt, by using the communication key, at least one of the startup information and the response information that are received by the auxiliary controller 20, to ensure security and confidentiality of information in the communication process.

In a communication process between the target controller 10 and the auxiliary controller 20, the auxiliary controller 20 sends the challenge information to the target controller 10, and after receiving the challenge information, the target controller 10 sends the response information (response) to the auxiliary controller 20. The auxiliary controller 20 verifies source credibility and integrity of a boot program (Bootloader) and a system (System) in a startup process of the target controller 10 by using public key information, image hash values, and image signature values that are of the boot program and the system and that are in the response information, a challenge-response protocol, and the public key information that is stored in the secure storage unit 21. When verifying the source credibility and the integrity of the boot program and the system of the target controller 10, the auxiliary controller 20 sends the running information to the target controller 10.

The auxiliary controller 20 securely communicates, based on a public key system and by using the challenge-response protocol, with the target controller 10 that does not have the secure storage unit, so that the target controller 10 can be securely started based on a hardware root of trust.

Figure 4:
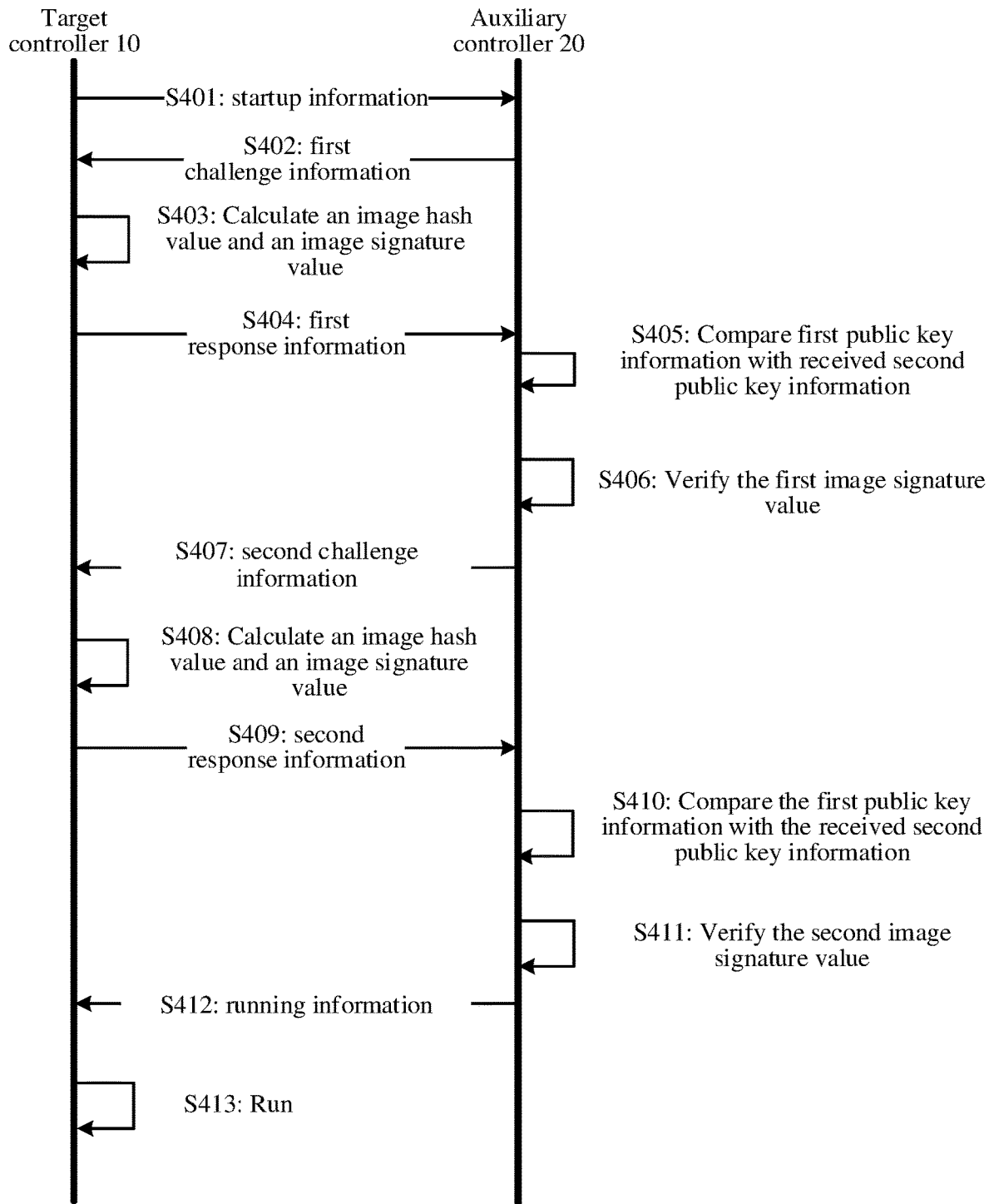
FIG. 4 is a schematic flowchart of a communication process between a target controller and an auxiliary controller according to an embodiment.

FIG. 4 is a schematic flowchart of a communication process between a target controller 10 and an auxiliary controller 20 according to an embodiment. As shown in FIG. 4, an exemplary communication process between the target controller 10 and the auxiliary controller 20 is as follows:

Step S401: The target controller 10 sends startup information.

Before step S401, the auxiliary controller 20 has already run normally. After being powered on, the target controller 10 enters a boot code control program, and sends the startup information to the auxiliary controller 20.

The startup information is a secure startup program that is used to trigger the auxiliary controller 20 to participate in authentication of the boot code control program and/or a system control program of the target controller 10.

Step S402: After receiving the startup information, the auxiliary controller 20 enters a phase of assisting with startup of the target controller 10, and then sends first challenge information to the target controller 10.

The auxiliary controller 20 generates one piece of challenge information based on a challenge-response protocol, and sends the challenge information to the boot code control program in the target controller 10 to verify source credibility and integrity of a boot program.

Step S403: After receiving the first challenge information, the target controller 10 calculates an image hash value and an image signature value of the boot program.

In a possible embodiment, when the auxiliary controller 20 needs to verify the source credibility and the integrity of the boot program, the target controller 10 calculates an image hash of the boot program (Bootloader) to obtain an image hash value Hash(Image), and then raises the value to a $C^{th}$ power modulo N to obtain a first image hash value A1 as follows:

$$A1 = \text{Hash}(\text{Image})^{C1} \mod N; \text{ where}$$

C1 is the first challenge information, and C1 and N are positive integers.

In a process of calculating the signature value of the boot program (Bootloader), the target controller 10 signs the first image hash value A1 to obtain a signature value Signature, and raises the value to a $C^{th}$ power modulo N to obtain a first image signature value B1 as follows:

$$B1 = \text{Signaure}^{C1} \mod N; \text{ where}$$

C1 is the first challenge information, and C1 and N are positive integers.

Step S404: The target controller 10 sends first response information to the auxiliary controller 20.

In a possible embodiment, the first response information (response) includes second public key information (e, N), the first image hash value A1, and the first image signature value B1. The second public key information (e, N) is compared with first public key information (e', N) stored in a secure storage unit 21.

Step S405: After receiving the first response information, the auxiliary controller 20 determines, through comparison, whether the first public key information stored in the secure storage unit 21 is the same as the received second public key information.

The secure storage unit 21 needs to store public key information of a target controller 10 that needs to be verified. If the secure storage unit 21 does not store the public key information of the target controller 10, the auxiliary controller 20 cannot assist with verification of security of the target controller 10.

The auxiliary controller 20 determines, through comparison, whether the first public key information (e', N) is the same as the second public key information (e, N). If it is determined through comparison that the first public key information (e', N) is different from the second public key information (e, N), the auxiliary controller 20 returns verification failure information to the target controller 10, and the target controller 10 cannot start.

Step S406: When it is determined through comparison that the first public key information is the same as the second public key information, verify the first image signature value by using the first public key information and the first image hash value.

In a possible embodiment, after the auxiliary controller 20 raises the first image hash value A1 to a (first public key information (e', N))$^{th}$ power modulo N, an obtained hash value A1' is:

$$A1'=A1^{e'} \bmod N;\text{ where}$$

e' is the first public key information, and e' and N are positive integers.

Then, the hash value A1' is compared with the first image signature value B1. If it is determined through comparison that the hash value A1' is different from the first image signature value B1, the auxiliary controller 20 returns verification failure information to the target controller 10, and the target controller 10 cannot be started.

Step S407: When it is determined through comparison that the hash value A1' is the same as the first image signature value B1, the auxiliary controller 20 sends second challenge information to the target controller 10.

The auxiliary controller 20 generates another piece of challenge information based on the challenge-response protocol, and sends the challenge information to the system control program in the target controller 10 to verify the source credibility and the integrity of the system.

It should be noted that the first challenge information and the second challenge information that are generated by the auxiliary controller 20 are different. The first challenge information is sent to the code control program in the target controller 10, and is used to calculate the first image hash value A1 and the first signature value B1 of the boot code control program. The second challenge information is sent to the system control program in the target controller 10, and is used to calculate the second image hash value A2 and the second signature value B2 of the system control program.

Step S408: After receiving the second challenge information, the target controller 10 calculates an image hash value and an image signature value of the system.

In a possible embodiment, when the auxiliary controller 20 needs to verify the source credibility and the integrity of the system, the target controller 10 calculates an image hash of the system (System) to obtain an image hash value Hash(Image), and then raises the value to a C$^{th}$ power modulo N to obtain a second image hash value A2 as follows:

$$A2=\text{Hash(Image)}^{C2} \bmod N;\text{ where}$$

C2 is the second challenge information, and C2 and N are positive integers.

In a process of calculating the signature value of the system (System), the target controller 10 signs the second image hash value A2 to obtain a signature value Signature, and raises the value to a C$^{th}$ power modulo N to obtain a second image signature value B2 as follows:

$$B2=\text{Signature}^{C2} \bmod N;\text{ where}$$

C2 is the second challenge information, and C2 and N are positive integers.

Step S409: The target controller 10 sends second response information to the auxiliary controller 20.

In a possible embodiment, the second response information includes second public key information (e, N), the second image hash value A2, and the second image signature value B2. The second public key information (e, N) is compared with the first public key information (e', N) stored in the secure storage unit 21.

Step S410: After receiving the second response information, the auxiliary controller 20 determines, through comparison, whether the first public key information stored in the secure storage unit 21 is the same as the received second public key information.

The auxiliary controller 20 determines, through comparison, whether the first public key information (e', N) is the same as the second public key information (e, N). If it is determined through comparison that the first public key information (e', N) is different from the second public key information (e, N), the auxiliary controller 20 returns verification failure information to the target controller 10, and the target controller 10 cannot start.

In an embodiment, the second public key information in the second response information (response) and the second public key information in the first response information (response) may be the same or different. If the second public key information in the second response information and the second public key information in the first response information are different, the secure storage unit 21 needs to store public key information of two target controllers 10, and then separately compare public key information in two pieces of response information (response) sent by the target controllers 10.

In an embodiment, the second response information (response) may not include the second public key information. After it is verified that the two pieces of public key information are the same in step S405, the two pieces of public key information do not need to be verified again. In this case, step S410 is not required.

Step S411: When it is determined through comparison that the first public key information is the same as the second public key information, verify the second image signature value by using the first public key information and the second image hash value.

In a possible embodiment, after the auxiliary controller 20 raises the second image hash value A2 to a (first public key information (e', N))$^{th}$ power modulo N, an obtained hash value A2' is:

$$A2'=A2^{e'} \bmod N;\text{ where}$$

e' is the first public key information, and e' and N are positive integers.

Then, the hash value A2' is compared with the second image signature value B2. If it is determined through comparison that the hash value A2' is different from the second image signature value B2, the auxiliary controller 20 returns verification failure information to the target controller 10, and the target controller 10 cannot start.

Step S412: When it is determined through comparison that the hash value A2' is the same as the second image signature value B2, the auxiliary controller 20 sends running information to the target controller 10.

The running information is generated when the auxiliary controller 20 verifies the second information by using the first public key information and the first information. A function of the running information is to run the boot code control program and the system control program.

Step S413: After receiving the running information, the target controller 10 enters a normal running state.

The target controller 10 communicates with the auxiliary controller 20 that has the secure storage unit 21, so that security verification can be performed, by using the secure storage unit 21 in the auxiliary controller 20, on the target controller 10 that does not have the secure storage unit, to enable the target controller 10 to enter the normal running state.

In a possible embodiment, in a communication process between the target controller 10 and the auxiliary controller 20, the target controller 10 uses, through secure communication, a common key to encrypt content sent by the target controller 10 and the auxiliary controller 20 in the communication process, thereby ensuring security and confidentiality of information transmission in the communication process.

In a possible embodiment, in the communication process between the target controller 10 and the auxiliary controller 20, a nonce (Nonce) is used as protection for withstanding a replay attack. In information security, the nonce (Nonce) is a digit that can be used for only once in encrypted communication. In actual use, a random number or a serial number may be used. A focus is that there needs to be a change in each time of use, to withstand the replay attack.

Figure 5:
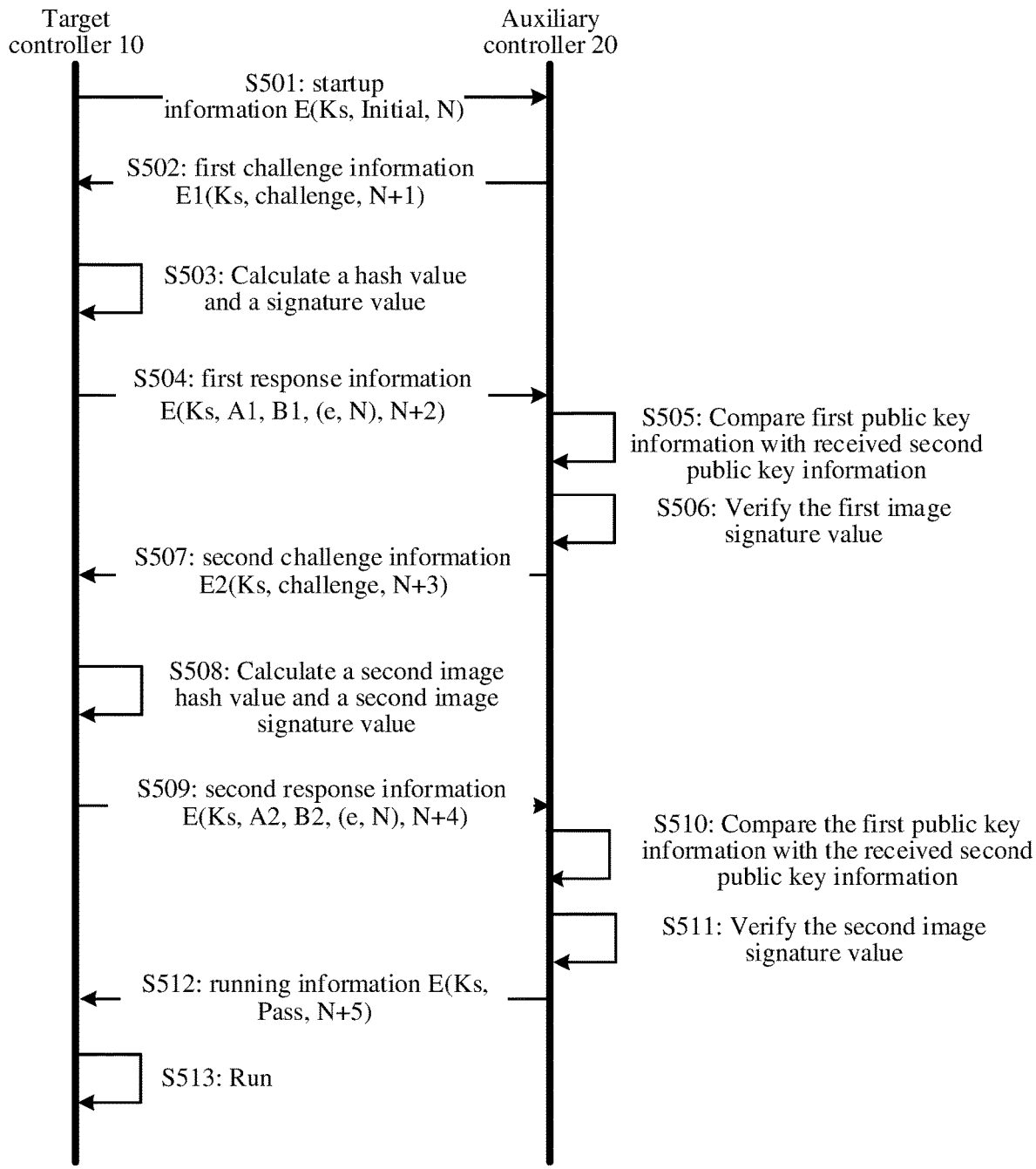
FIG. 5 is a schematic flowchart of a communication process between a target controller and an auxiliary controller through encryption according to an embodiment.

FIG. 5 is a schematic flowchart of a communication process between a target controller 10 and an auxiliary controller 20 through encryption according to an embodiment. As shown in FIG. 5, an exemplary communication process between the target controller 10 and the auxiliary controller 20 is as follows:

Step S501: The target controller 10 sends startup information.

Before step S501, the auxiliary controller 20 has already run normally. After being powered on, the target controller 10 enters a boot code control program, and sends the startup information to the auxiliary controller 20.

The startup information is a secure startup program that is used to trigger the auxiliary controller 20 to participate in authentication of the boot code control program and/or a system control program of the target controller 10. The startup information includes a startup signal Initial and a nonce N. The target controller 10 protects the startup information through encryption by using a key Ks to generate transmission information denoted as E(Ks, Initial, N), and sends the transmission information to the auxiliary controller 20.

Step S502: After receiving the startup information, the auxiliary controller 20 enters a phase of assisting with startup of the target controller 10, and then sends first challenge information to the target controller 10.

The auxiliary controller 20 generates one piece of challenge information based on a challenge-response protocol, and sends the challenge information to the boot code control program in the target controller 10 to verify source credibility and integrity of a boot program.

After receiving the transmission information E(Ks, Initial, N), the auxiliary controller 20 decrypts the transmission information E(Ks, Initial, N) and then obtains the startup signal Initial, so that the auxiliary controller 20 enters the phase of assisting with startup of the target controller 10. In addition, the auxiliary controller 20 protects the challenge information and a nonce N+1 through encryption by using the key Ks to generate return information denoted as E1(Ks, challenge, N+1), and sends the return information to the target controller 10. N+1 represents the nonce plus 1, in other words, represents continuation of a transmission information in step S501.

Step S503: After receiving the first challenge information, the target controller 10 calculates an image hash value and an image signature value of the boot program.

After receiving the transmission information E1(Ks, challenge, N+1), the auxiliary controller 20 decrypts the transmission information E1(Ks, challenge, N+1) and then obtains challenge information, so that the auxiliary controller 20 calculates the image hash value and the image signature value of the boot program.

In a possible embodiment, when the auxiliary controller 20 needs to verify the source credibility and the integrity of the boot program, the target controller 10 calculates an image hash of the boot program (Bootloader) to obtain an image hash value Hash(Image), and then raises the value to a $C^{th}$ power modulo N to obtain a first image hash value A1 as follows:

$$A1 = \text{Hash}(\text{Image})^{C1} \bmod N; \text{ where}$$

C1 is the first challenge information, and C1 and N are positive integers.

In a process of calculating the signature value of the boot program (Bootloader), the target controller 10 signs the first image hash value A1 to obtain a signature value Signature, and raises the value to a $C^{th}$ power modulo N to obtain a first image signature value B1 as follows:

$$B1 = \text{Signaure}^{C1} \bmod N; \text{ where}$$

C1 is the first challenge information, and C1 and N are positive integers.

Step S504: The target controller 10 sends first response information to the auxiliary controller 20.

In a possible embodiment, the target controller 10 protects second public key information (e, N), the first image hash value A1, the first signature value B1, and a nonce N+2 through encryption by using the key Ks to generate transmission information denoted as E(Ks, A1, B1, (e, N), N+2), and sends the transmission information to the target controller 10. N+2 represents the nonce plus 1, in other words, represents continuation of a return information in step S502.

The second public key information (e, N) is compared with first public key information (e', N) stored in a secure storage unit 21.

Step S505: After receiving the first response information, the auxiliary controller 20 determines, through comparison, whether the first public key information stored in the secure storage unit 21 is the same as the received second public key information.

The secure storage unit 21 needs to store public key information of a target controller 10 that needs to be verified. If the secure storage unit 21 does not store the public key information of the target controller 10, the auxiliary controller 20 cannot assist with verification of security of the target controller 10.

The auxiliary controller 20 determines, through comparison, whether the first public key information (e', N) is the same as the second public key information (e, N). If it is determined through comparison that the first public key information (e', N) is different from the second public key information (e, N), the auxiliary controller 20 returns verification failure information to the target controller 10, and the target controller 10 cannot start.

The failure information includes a nonce N+3 and a failure signal Not Pass that is used to terminate startup of the target controller 10. The auxiliary controller 20 protects the failure information through encryption by using the key Ks to generate return information denoted as E(Ks, Not Pass, N+3), and sends the return information to the target controller 10. N+3 represents the nonce plus 1, in other words, represents continuation of a return information in step S504.

Step S506: When it is determined through comparison that the first public key information is the same as the second public key information, verify the first image signature value by using the first public key information and the first image hash value.

In a possible embodiment, after the auxiliary controller 20 raises the first image hash value A1 to a (first public key information (e', N))$^{th}$ power modulo N, an obtained hash value A1' is:

$$A1'=A1^{e'} \bmod N; \text{ where}$$

e' is the first public key information, and e' and N are positive integers.

Then, the hash value A1' is compared with the first image signature value B1. If it is determined through comparison that the hash value A1' is different from the first image signature value B1, the auxiliary controller 20 returns verification failure information to the target controller 10, and the target controller 10 cannot start.

The failure information includes a nonce N+3 and a failure signal Not Pass that is used to terminate startup of the target controller 10. The auxiliary controller 20 protects the failure information through encryption by using the key Ks to generate return information denoted as E(Ks, Not Pass, N+3), and sends the return information to the target controller 10. N+3 represents the nonce plus 1, in other words, represents continuation of a return information in step S504.

Step S507: When it is determined through comparison that the hash value A1' is the same as the first image signature value B1, the auxiliary controller 20 sends second challenge information to the target controller 10.

The auxiliary controller 20 generates another piece of challenge information based on the challenge-response protocol, and sends the challenge information to the system control program in the target controller 10 to verify the source credibility and the integrity of the system.

The auxiliary controller 20 protects the challenge information and a nonce N+4 through encryption by using the key Ks to generate return information denoted as E2(Ks, challenge, N+3), and sends the return information to the target controller 10. N+3 represents the nonce plus 1, in other words, represents continuation of a return information in step S504.

It should be noted that the first challenge information and the second challenge information that are generated by the auxiliary controller 20 are different. The first challenge information is sent to the boot code control program in the target controller 10, and is used to calculate the first image hash value A1 and the first signature value B1 of the boot code control program. The second challenge information is sent to the system control program in the target controller 10 and is used to calculate the second image hash value A2 and the second signature value B2 of the system control program.

Step S508: After receiving the second challenge information, the target controller 10 calculates an image hash value and an image signature value of a system.

After receiving the transmission information E2(Ks, challenge, N+3), the auxiliary controller 20 decrypts the transmission information E2(Ks, challenge, N+3) and then obtains challenge information, so that the auxiliary controller 20 calculates the image hash value and the image signature value of the system (System).

In a possible embodiment, when the auxiliary controller 20 needs to verify the source credibility and the integrity of the system, the target controller 10 calculates an image hash of the system (System) to obtain an image hash value Hash(Image), and then raises the value to a $C^{th}$ power modulo N to obtain a second image hash value A2 as follows:

$$A2=\text{Hash(Image)}^{C2} \bmod N; \text{ where}$$

C2 is the second challenge information, and C2 and N are positive integers.

In a process of calculating the signature value of the system (System), the target controller 10 signs the second image hash value A2 to obtain a signature value Signature, and raises the value to a $C^{th}$ power modulo N to obtain a second image signature value B2 as follows:

$$B2=\text{Signature}^{C2} \bmod N; \text{ where}$$

C2 is the second challenge information, and C2 and N are positive integers.

Step S509: The target controller 10 sends second response information to the auxiliary controller 20.

In a possible embodiment, the target controller 10 protects second public key information (e, N), the second image hash value A2, the second signature value B2, and a nonce N+4 through encryption by using the key Ks to generate transmission information denoted as E(Ks, A2, B2, (e, N), N+4), and sends the transmission information to the auxiliary controller 20. N+4 represents the nonce plus 1, in other words, represents continuation of a return information in step S507.

The second public key information (e, N) is compared with the first public key information (e', N) stored in the secure storage unit 21.

Step S510: After receiving the second response information, the auxiliary controller 20 determines, through comparison, whether the first public key information stored in the secure storage unit 21 is the same as the received second public key information.

The auxiliary controller 20 determines, through comparison, whether the first public key information (e', N) is the same as the second public key information (e, N). If it is determined through comparison that the first public key information (e', N) is different from the second public key information (e, N), the auxiliary controller 20 returns verification failure information to the target controller 10, and the target controller 10 cannot start.

The failure information includes a nonce N+5 and a failure signal Not Pass that is used to terminate startup of the target controller 10. The auxiliary controller 20 protects the failure information through encryption by using the key Ks to generate return information denoted as E(Ks, Not Pass, N+5), and sends the return information to the target controller 10. N+5 represents the nonce plus 1, in other words, represents continuation of a return information in step S509.

In an embodiment, the second public key information in the second response information (response) and the second public key information in the first response information (response) may be the same or different. If the second public key information in the second response information and the second public key information in the first response information are different, the secure storage unit 21 needs to store public key information of two target controllers 10, and then separately compare public key information in two pieces of response information (response) sent by the target controllers 10.

In an embodiment, the second response information (response) may not include the second public key information. After it is verified that the public key information is the same in step S505, the public key information does not need to be verified again. In this case, step S510 is not required.

Step S511: When it is determined through comparison that the first public key information is the same as the second public key information, verify the second image signature value by using the first public key information and the second image hash value.

In a possible embodiment, after the auxiliary controller 20 raises the second image hash value A2 to a (first public key information (e', N))$^{th}$ power modulo N, an obtained hash value A2' is:

$$A2'=A2^{e'} \bmod N; \text{ where}$$

e' is the first public key information, and e' and N are positive integers.

Then, the hash value A2' is compared with the second image signature value B2. If it is determined through comparison that the hash value A2' is different from the second image signature value B2, the auxiliary controller 20 returns verification failure information to the target controller, and the target controller 10 cannot start.

The failure information includes a nonce N+5 and a failure signal Not Pass that is used to terminate startup of the target controller 10. The auxiliary controller 20 protects the failure information through encryption by using the key Ks to generate return information denoted as E(Ks, Not Pass, N+5), and sends the return information to the target controller 10. N+5 represents the nonce plus 1, in other words, represents continuation of a return information in step S509.

Step S512: When it is determined through comparison that the hash value A2' is the same as the second image signature value B2, the auxiliary controller 20 sends running information to the target controller 10.

The running information is generated when the auxiliary controller 20 verifies the second information by using the first public key information and the first information. A function of the running information is to run the boot code control program and the system control program.

The running information includes a nonce N+5 and a running signal Pass that is used to start the target controller 10. The auxiliary controller 20 protects the running information through encryption by using the key Ks to generate return information denoted as E(Ks, Pass, N+5), and sends the return information to the target controller 10. N+5 represents the nonce plus 1, in other words, represents continuation of a return information in step S509.

Step S513: After receiving the running information, the target controller 10 enters a normal running state.

The target controller 10 encrypts, in the communication process between the target controller 10 and the auxiliary controller 20, content sent by the target controller 10 and the auxiliary controller 20, to ensure security and confidentiality of information transmission in the communication process. In addition, the nonce (Nonce) is used as protection for withstanding a replay attack.

In the following embodiments, in a process of verifying the target controller, the auxiliary controller 20 performs verification based on a key system, in other words, the security storage unit in the auxiliary controller 20 pre-stores key information of the target controller 10, and then compares a value obtained after hashing a hash value sent by the target controller 10 with a signature value to verify security of the target controller 10, thereby ensuring security and confidentiality of information transmission in the communication process. It may be learned by a person skilled in the art that a verification method is not limited to the method mentioned in the embodiments, and may be another method that can verify the security of the target controller.

Figure 6:
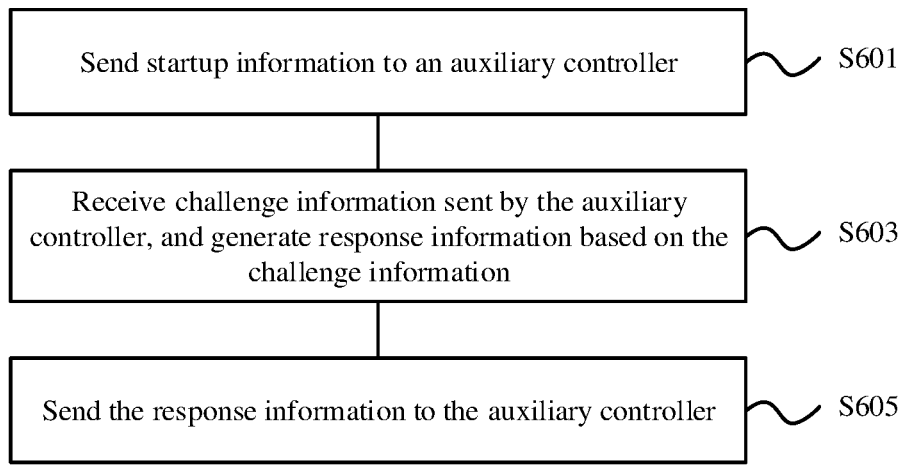
FIG. 6 is a schematic flowchart of a third secure startup method according to an embodiment.

FIG. 6 is a schematic flowchart of a third secure startup method according to an embodiment. As shown in FIG. 6, a secure startup method is performed by a target controller 10. An exemplary implementation process is as follows:

Step S601: Send startup information to an auxiliary controller 20.

Before the target controller 10 sends the startup information, the auxiliary controller 20 has already worked normally.

The startup information is a secure startup program that is used to trigger the auxiliary controller 20 to participate in authentication of a boot code control program and/or a system control program of the target controller 10.

In this embodiment, the auxiliary controller 20 generates at least two pieces of challenge information. The auxiliary controller 20 includes a secure storage unit 21. The secure storage unit 21 has a tamper resistance function, and stores first key information, a boot code control program and/or a system control program, and at least two original hash values.

In this embodiment, the auxiliary controller 20 generates a plurality of pieces of challenge information that are sent to the target controller 10 to obtain related information, and then the auxiliary controller 20 separately hashes the plurality of pieces of challenge information and the boot code control program and/or the system control program of the target controller 10 to obtain hash values, and then performs hash with a key stored in the secure storage unit 21, to obtain original hash values of a plurality of boot programs and original hash values of a plurality of systems.

Step S603: Receive challenge information sent by the auxiliary controller 20 and generate response information based on the challenge information.

In a possible case, after receiving first challenge information selected, for sending, from the at least two pieces of challenge information generated by the auxiliary controller 20, the boot code control program of the target controller 10 hashes the first challenge information and an image of the boot code control program to obtain a first image hash value; and after receiving second challenge information selected, for sending, from the at least two pieces of challenge information generated by the auxiliary controller 20, the system control program of the target controller 10 hashes the second challenge information and an image of the system control program to obtain a second image hash value.

Step S605: Send response information to the auxiliary controller 20.

Step S607: Receive running information sent by the auxiliary controller 20.

The running information is generated when the auxiliary controller 20 verifies the response information by using the first key information and an original hash value. A function of the running information is to notify the target controller 10 whether the response information is verified.

Step S609: Run a first program.

The first program includes the boot code control program and/or the system control program.

In a possible embodiment, the target controller 10 stores a communication key, and is configured to: in a process of communicating with the auxiliary controller 20, encrypt, by using the communication key, at least one of the startup information and the response information that are sent by the target controller 10, and decrypt, by using the communication key, at least one of the challenge information and the running information that are received by the target controller 10, to ensure security and confidentiality of information in the communication process.

In a communication process between the target controller 10 and the auxiliary controller 20, after receiving one piece of challenge information selected from the plurality of pieces of challenge information generated and sent by the auxiliary controller 20, the target controller 10 sends the response information (response) to the auxiliary controller

20. The auxiliary controller 20 verifies source credibility and integrity of a boot program (Bootloader) and a system (System) in a startup process of the target controller 10 by using image hash values that are of the boot program and the system and that are in the response information, a challenge-response protocol, and the public key information that is stored in the secure storage unit 21. The target controller 10 can enter a normal working state only when the auxiliary controller 20 verifies the source credibility and the integrity of the boot program and the system of the target controller 10.

The target controller 10 securely communicates, based on a key system and by using the challenge-response protocol, with the auxiliary controller 20 that has the secure storage unit 21, thereby implementing secure startup based on a hardware root of trust.

Figure 7:
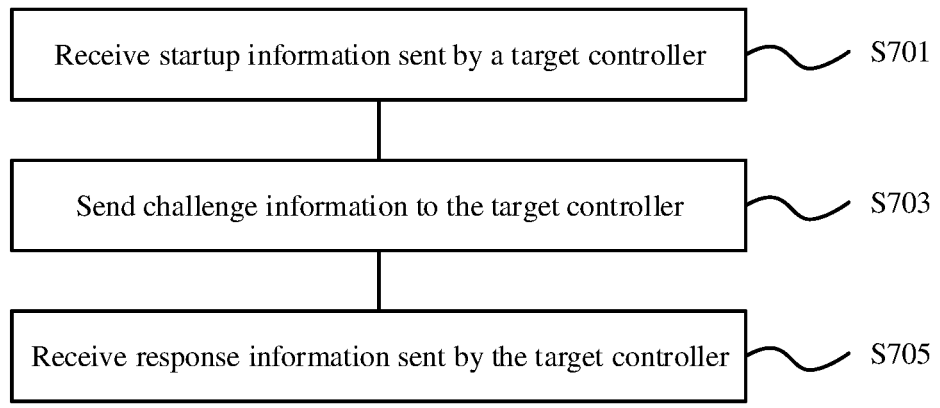
FIG. 7 is a schematic flowchart of a fourth secure startup method according to an embodiment.

FIG. 7 is a schematic flowchart of a fourth secure startup method according to an embodiment. As shown in FIG. 7, this secure startup method is performed by an auxiliary controller 20. An exemplary implementation process is as follows:

Step S701: Receive startup information sent by a target controller 10.

The startup information triggers to authenticate a first program of the target controller 10.

After being powered on, the target controller 10 enters a boot code control program, and sends, to the auxiliary controller 20, the startup information that is used to start the auxiliary controller 20 to verify security of the target controller 10, so that the auxiliary controller 20 enters an auxiliary secure startup program.

In this embodiment, the auxiliary controller 20 generates at least two pieces of challenge information. The auxiliary controller 20 includes a secure storage unit 21. The secure storage unit 21 has a tamper resistance function, and stores first key information, a boot code control program and/or a system control program, and at least two pieces of challenge information.

In this embodiment, the auxiliary controller 20 generates a plurality of pieces of challenge information that are sent to the target controller 10 to obtain related information, and then the auxiliary controller 20 separately hashes the plurality of pieces of challenge information and the boot code control program and/or the system control program of the target controller 10 to obtain hash values, and then performs hash with a key stored in the secure storage unit 21, to obtain original hash values of a plurality of boot programs and original hash values of a plurality of systems.

Step S703: Send the challenge information to the target controller 10.

The challenge information is used to enable the target controller 10 to generate response information. The response information is an image hash value of the boot code control program and/or an image hash value of the system control program.

In a possible case, the boot code control program in the target controller 10 receives first challenge information selected, for sending, from the at least two pieces of challenge information generated by the auxiliary controller 20, and first response information sent by the target controller 10 includes a first image hash value. The first image hash value is obtained by hashing the first challenge information and an image of the boot code control program. The system control program in the target controller 10 receives second challenge information selected, for sending, from the at least two pieces of challenge information generated by the auxiliary controller 20, and second response information sent by the target controller 10 includes a second image hash value. The second image hash value is obtained by hashing the second challenge information and an image of the system control program.

Step S705: Receive the response information sent by the target controller 10.

Step S707: Send running information to the target controller 10.

The running information is generated when the auxiliary controller 20 verifies the response information by using the first key information and an original hash value. A function of the running information is to notify the target controller 10 whether the response information is verified.

In a possible embodiment, a hash value obtained after hashing the first key information and the first image hash value is compared with an original hash value of the boot code control program corresponding to the first challenge information, and after the hash value is the same as the original hash value, the second challenge information is sent to the target controller; and a hash value obtained after hashing the first key information and the second image hash value is compared with an original hash value of the system control program corresponding to the second challenge information, and after the hash value is the same as the original hash value, the running information is sent to the target controller 10.

In a possible embodiment, the secure storage unit 21 further stores a communication key, and is configured to: in a process of communicating with the target controller 10, encrypt, by using the communication key, at least one of the challenge information and the running information that are sent by the auxiliary controller 20, and decrypt, by using the communication key, at least one of the startup information and the response information that are received by the auxiliary controller 20, to ensure security and confidentiality of information in the communication process.

In a communication process between the target controller 10 and the auxiliary controller 20, the auxiliary controller 20 selects one piece of challenge information from the plurality of pieces of generated challenge information and sends the challenge information to the target controller 10, and after receiving the challenge information, the target controller 10 sends the response information (response) to the auxiliary controller 20. The auxiliary controller 20 verifies source credibility and integrity of a boot program (Bootloader) and a system (System) in a startup process of the target controller 10 by using image hash values that are of the boot program and the system and that are in the response information, a challenge-response protocol, and the key information that is stored in the secure storage unit 21. When verifying the source credibility and the integrity of the boot program and the system of the target controller 10, the auxiliary controller 20 sends the running information to the target controller 10.

The auxiliary controller 20 securely communicates, based on a key system and by using the challenge-response protocol, with the target controller 10 that does not have the secure storage unit, so that the target controller 10 can be securely started based on a hardware root of trust.

Figure 8:
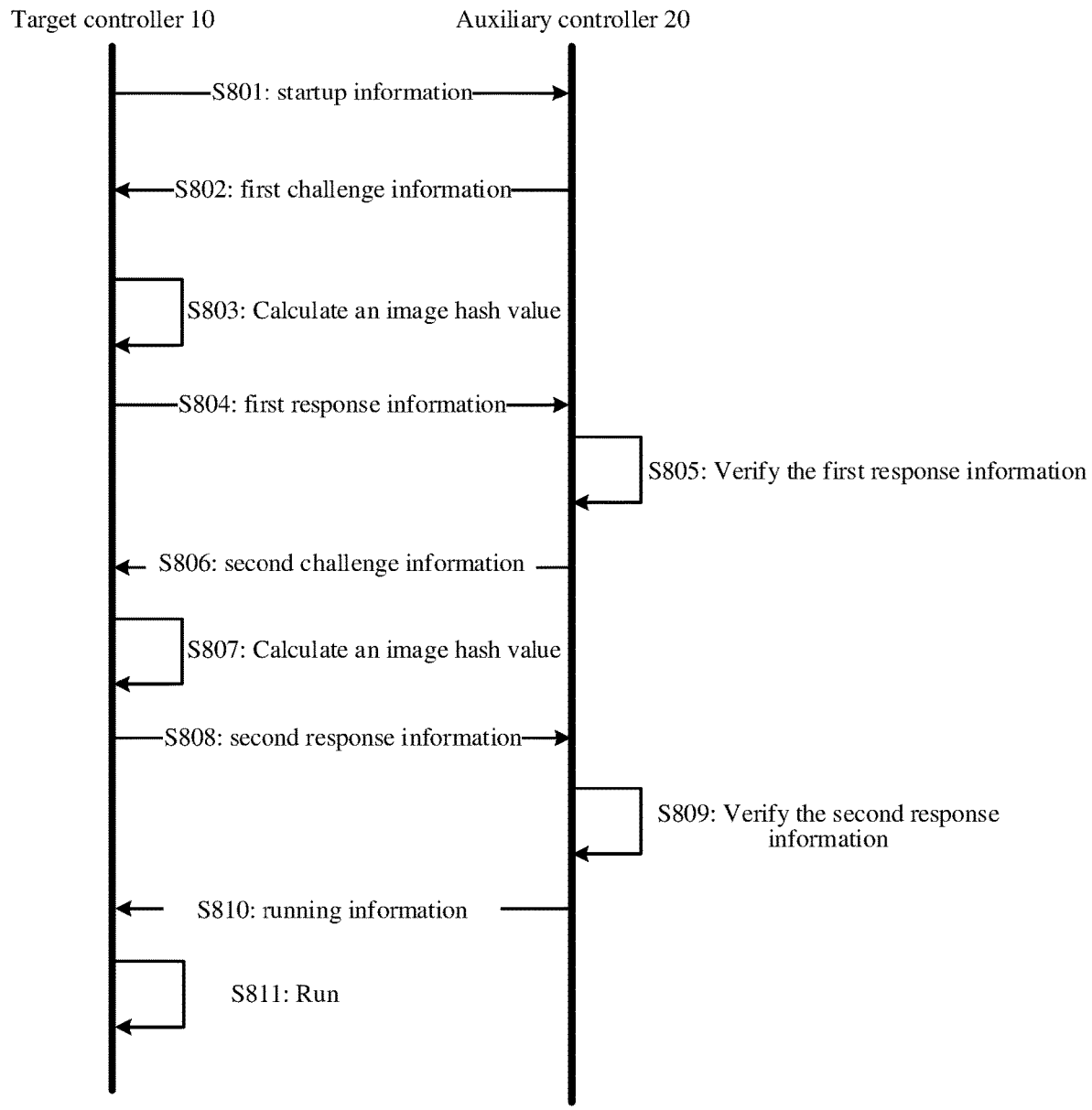
FIG. 8 is a schematic flowchart of a communication process between a target controller and an auxiliary controller according to an embodiment.

FIG. 8 is a schematic flowchart of a communication process between a target controller 10 and an auxiliary controller 20 according to an embodiment. As shown in FIG. 8, an exemplary communication process between the target controller 10 and the auxiliary controller 20 is as follows:

Step S801: The target controller 10 sends startup information.

Before step S801, the auxiliary controller 20 has already run normally. After being powered on, the target controller 10 enters a boot code control program and sends the startup information to the auxiliary controller 20.

The startup information is a secure startup program that is used to trigger the auxiliary controller 20 to participate in authentication of the boot code control program and a system control program of the target controller 10.

Step S802: After receiving the startup information, the auxiliary controller 20 enters a phase of assisting with startup of the target controller 10, and then selects first challenge information from a plurality of pieces of generated challenge information and sends the first challenge information to the target controller 10.

Before the auxiliary controller 20 is delivered from a factory, a vehicle manufacturer or a device vendor writes key information used to authenticate the target controller 10 to a secure storage unit 21 in the auxiliary controller 20. In addition, the secure storage unit 21 in the auxiliary controller 20 further stores a boot program (Bootloader) and a system (System) of the target controller 10.

In this embodiment, the auxiliary controller 20 generates a plurality of pieces of challenge information that are sent to the target controller 10 to obtain related information, and then the auxiliary controller 20 separately hashes the plurality of pieces of challenge information and the boot program (Bootloader) and the system (System) of the target controller 10 to obtain hash values, and then performs hash with a key stored in the secure storage unit 21, to obtain original hash values of a plurality of boot programs and original hash values of a plurality of systems.

The auxiliary controller 20 selects one piece of challenge information from the plurality of pieces of generated challenge information based on a challenge-response protocol, and sends the challenge information to the boot code control program in the target controller 10 to verify source credibility and integrity of the boot program.

Step S803: After receiving the first challenge information, the target controller 10 calculates an image hash value of the boot program based on the first challenge information.

In a possible embodiment, when the auxiliary controller 20 needs to verify the source credibility and the integrity of the boot program, the target controller 10 hashes the first challenge information and an image of the boot program (Bootloader) to obtain a first image hash value A1.

Step S804: The target controller 10 sends first response information to the auxiliary controller 20.

The target controller 10 sends the first image hash value A1 to the auxiliary controller 20, and the first image hash value A1 is compared with an original hash value of the boot program corresponding to the first challenge information.

Step S805: After receiving the first response information, the auxiliary controller 20 verifies the first response information by using first key information and the original hash value.

In a possible embodiment, after receiving the first image hash value A1, the auxiliary controller 20 hashes the first image hash value A1 and the first key information in the secure storage unit 21 to obtain a new first image hash value A1', and then compares the new first image hash value A1' with the original hash value of the boot program corresponding to the first challenge information. If it is determined through comparison that the new first image hash value A1' is different from the original hash value of the boot program corresponding to the first challenge information, the auxiliary controller 20 returns verification failure information to the target controller 10, and the target controller 10 cannot start.

Step S806: When it is determined through comparison that the new first image hash value is the same as the original hash value of the boot program corresponding to the first challenge information, the auxiliary controller 20 sends second challenge information in the plurality of pieces of generated challenge information to the target controller 10.

The auxiliary controller 20 selects another piece of challenge information from the plurality of pieces of generated challenge information based on the challenge-response protocol, and sends the challenge information to the system control program in the target controller 10 to verify source credibility and integrity of a system.

It should be noted that the first challenge information and the second challenge information that are selected by the auxiliary controller 20 are different. The first challenge information is sent to the boot code control program in the target controller 10 and is used to calculate the first image hash value of the boot code control program. The second challenge information is sent to the system control program in the target controller 10 and is used to calculate the second image hash value of the system control program.

Step S807: After receiving the second challenge information, the target controller 10 calculates an image hash value of the system based on the second challenge information.

In a possible embodiment, when the auxiliary controller 20 needs to verify the source credibility and the integrity of the system, the target controller 10 hashes the second challenge information and an image of the system (System) to obtain a second image hash value A2.

Step S808: The target controller 10 sends second response information to the auxiliary controller 20.

The target controller 10 sends the second image hash value A2 to the auxiliary controller 20, and the second image hash value A2 is compared with an original hash value of the system corresponding to the second challenge information.

Step S809: After receiving the second response information, the auxiliary controller 20 verifies the second response information by using the first key information and the original hash value.

In a possible embodiment, after receiving the second image hash value A2, the auxiliary controller 20 hashes the second image hash value A2 and the first key information in the secure storage unit 21 to obtain a new second image hash value A2', and then compares the new second image hash value A2' with the original hash value of the system corresponding to the second challenge information. If it is determined through comparison that the new second image hash value A2' is different from the original hash value of the system corresponding to the second challenge information, the auxiliary controller 20 returns verification failure information to the target controller 10, and the target controller 10 cannot start.

Step S810: When the new second image hash value is the same as the original hash value of the system corresponding to the second challenge information, the auxiliary controller 20 sends running information to the target controller 10.

The running information is generated when the auxiliary controller 20 verifies the response information by using the first key information and the original hash value. A function of the running information is to run the boot code control program and/or the system control program.

Step S811: After receiving the running information, the target controller 10 enters a normal running state.

The target controller 10 communicates with the auxiliary controller 20 that has the secure storage unit 21, so that security verification can be performed, by using the secure storage unit 21 in the auxiliary controller 20, on the target controller 10 that does not have the secure storage unit, to enable the target controller 10 to enter the normal running state. In addition, the secure storage unit 21 in the auxiliary controller 20 stores key information, the boot program, and the system that are of the target controller 10, so that a verification process is more secure.

In a possible embodiment, in a communication process between the target controller 10 and the auxiliary controller 20, the target controller 10 uses, through secure communication, a common key to encrypt content sent by the target controller 10 and the auxiliary controller 20 in the communication process, thereby ensuring security and confidentiality of information transmission in the communication process.

In a possible embodiment, in the communication process between the target controller 10 and the auxiliary controller 20, a nonce is used as protection for withstanding a replay attack.

Figure 9:
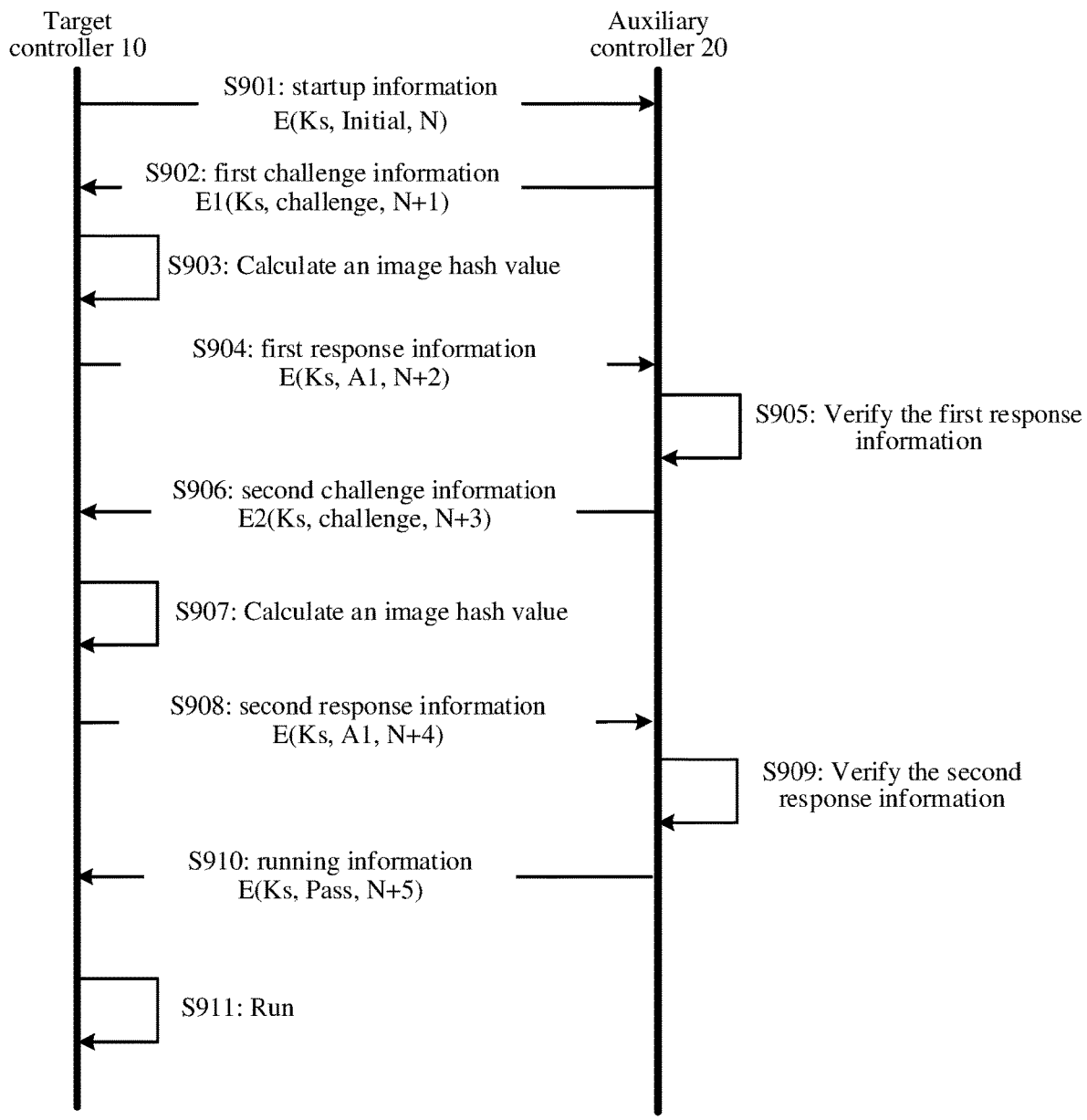
FIG. 9 is a schematic flowchart of a communication process between a target controller and an auxiliary controller through encryption according to an embodiment.

FIG. 9 is a schematic flowchart of a communication process between a target controller 10 and an auxiliary controller 20 through encryption according to an embodiment. As shown in FIG. 9, an exemplary communication process between the target controller 10 and the auxiliary controller 20 is as follows:

Step S901: The target controller 10 sends startup information.

Before step S901, the auxiliary controller 20 has already run normally. After being powered on, the target controller 10 enters a boot code control program and sends the startup information to the auxiliary controller 20.

The startup information includes a startup signal Initial and a nonce N. The target controller 10 protects the startup information through encryption by using a key Ks to generate transmission information denoted as E(Ks, Initial, N), and sends the transmission information to the auxiliary controller 20.

Step S902: After receiving the startup information, the auxiliary controller 20 enters a phase of assisting with startup of the target controller 10, and then selects first challenge information from a plurality of pieces of generated challenge information and sends the first challenge information to the target controller 10.

Before the auxiliary controller 20 is delivered from a factory, a vehicle manufacturer or a device vendor writes a boot program (Bootloader) and a system (System) of the target controller 10 and key information that is used to authenticate the target controller 10 to a secure storage unit 21 in the auxiliary controller 20. In addition, the secure storage unit in the auxiliary controller 20 further stores a communication key Ks.

In this embodiment, the auxiliary controller 20 generates a plurality of pieces of challenge information that are sent to the target controller 10 to obtain related information, and then the auxiliary controller 20 separately hashes the plurality of pieces of challenge information and the boot program (Bootloader) and the system (System) of the target controller 10 to obtain hash values, and then performs hash with the key stored in the secure storage unit 21, to obtain original hash values of a plurality of boot programs and original hash values of a plurality of systems.

The auxiliary controller 20 selects one piece of challenge information from the plurality of pieces of generated challenge information based on a challenge-response protocol and sends the challenge information to the boot code control program in the target controller 10 to verify source credibility and integrity of the boot program.

After receiving the transmission information E(Ks, Initial, N), the auxiliary controller 20 decrypts the transmission information E(Ks, Initial, N) and then obtains the startup signal Initial, so that the auxiliary controller 20 enters the phase of assisting with startup of the target controller 10. In addition, the auxiliary controller 20 protects the first challenge information and a nonce N+1 through encryption by using the key Ks to generate return information denoted as E1(Ks, challenge, N+1), and sends the return information to the target controller. N+1 represents the nonce plus 1, in other words, represents continuation of a transmission information in step S901.

Step S903: After receiving the first challenge information, the target controller 10 calculates an image hash value of the boot program based on the first challenge information.

After receiving the transmission information E1(Ks, challenge, N+1), the auxiliary controller 20 decrypts the transmission information E1(Ks, challenge, N+1) to obtain challenge information. When the auxiliary controller 20 needs to verify the source credibility and the integrity of the boot program, the target controller 10 performs an image hash on the first challenge information and the boot program to obtain a first image hash value A1.

Step S904: The target controller 10 sends first response information to the auxiliary controller 20.

In a possible embodiment, the target controller 10 protects the first image hash value A1 and a nonce N+2 through encryption by using the key Ks to generate transmission information denoted as E(Ks, A1, N+2), and sends the transmission information to the auxiliary controller 20. N+2 represents the nonce plus 1, in other words, represents continuation of a return information in step S502.

The first image hash value A1 is compared with an original hash value of the boot program corresponding to the first challenge information.

Step S905: After receiving the first response information, the auxiliary controller 20 verifies the first response information by using first key information and the original hash value.

In a possible embodiment, after receiving the first image hash value A1, the auxiliary controller 20 hashes the first image hash value A1 and the first key information in the secure storage unit 21 to obtain a new first image hash value A1', and then compares the new first image hash value A1' with the original hash value of the boot program corresponding to the first challenge information. If the new first image hash value A1' is different from the original hash value of the boot program corresponding to the first challenge information, the auxiliary controller 20 returns verification failure information to the target controller 10, and the target controller 10 cannot start.

The failure information includes a nonce N+3 and a failure signal Not Pass that is used to terminate startup of the target controller 10. The auxiliary controller 20 protects the failure information through encryption by using the key Ks to generate return information denoted as E(Ks, Not Pass, N+3), and sends the return information to the target controller 10. N+3 represents the nonce plus 1, in other words, represents continuation of a return information in step S904.

Step S906: When it is determined through comparison that the new first image hash value is the same as the original hash value of the boot program corresponding to the first challenge information, the auxiliary controller 20 sends second challenge information in the plurality of pieces of generated challenge information to the target controller 10.

The auxiliary controller 20 selects another piece of challenge information from the plurality of pieces of generated challenge information based on the challenge-response protocol and sends the challenge information to the system control program in the target controller 10 to verify source credibility and integrity of a system.

The auxiliary controller 20 protects the challenge information and a nonce N+4 through encryption by using the key Ks to generate return information denoted as E2(Ks, challenge, N+3), and sends the return information to the target controller 10. N+3 represents the nonce plus 1, in other words, represents continuation of a return information in step S904.

It should be noted that the first challenge information and the second challenge information that are selected by the auxiliary controller 20 are different. The first challenge information is sent to the boot code control program in the target controller 10 and is used to calculate the first image hash value of the boot code control program. The second challenge information is sent to the system control program in the target controller 10 and is used to calculate the second image hash value of the system control program.

Step S907: After receiving the second challenge information, the target controller 10 calculates an image hash value of the system based on the second challenge information.

After receiving the transmission information E2(Ks, challenge, N+3), the auxiliary controller 20 decrypts the transmission information E2(Ks, challenge, N+3) to obtain challenge information, so that the auxiliary controller 20 calculates the image hash value and an image signature value of the system.

In a possible embodiment, when the auxiliary controller 20 needs to verify the source credibility and the integrity of the system, the target controller 10 hashes the second challenge information and an image of the system (System) to obtain a second image hash value A2.

Step S908: The target controller 10 sends second response information to the auxiliary controller 20.

In a possible embodiment, the target controller 10 protects the second image hash value A2 and a nonce N+4 through encryption by using the key Ks to generate transmission information denoted as E(Ks, A2, N+4), and sends the transmission information to the target controller 10. N+4 represents the nonce plus 1, in other words, represents continuation of a return information in step S907.

The second image hash value A2 is compared with an original hash value of the system corresponding to the second challenge information.

Step S909: After receiving the second response information, the auxiliary controller 20 verifies the second response information by using the first key information and the original hash value.

In a possible embodiment, after receiving the second image hash value A2, the auxiliary controller 20 hashes the second image hash value A2 and the first key information in the secure storage unit 21 to obtain a new second image hash value A2', and then compares the new second image hash value A2' with the original hash value of the system corresponding to the second challenge information. If the new second image hash value A2' is different from the original hash value of the system corresponding to the second challenge information, the auxiliary controller 20 returns verification failure information to the target controller 10, and the target controller 10 cannot start.

The failure information includes a nonce N+5 and a failure signal Not Pass that is used to terminate startup of the target controller 10. The auxiliary controller protects the failure information through encryption by using the key Ks to generate return information denoted as E(Ks, Not Pass, N+5), and sends the return information to the target controller 10. N+5 represents the nonce plus 1, in other words, represents continuation of a return information in step S908.

Step S910: When it is determined through comparison that the new second image hash value is the same as the original hash value of the system corresponding to the second challenge information, the auxiliary controller 20 sends running information to the target controller 10.

The running information is generated when the auxiliary controller 20 verifies the response information by using the first key information and the original hash value. A function of the running information is to run the boot code control program and/or the system control program.

The running information includes a nonce N+5 and a running signal Pass that is used to start the target controller 10. The auxiliary controller 20 protects the running information through encryption by using the key Ks to generate return information denoted as E(Ks, Pass, N+5), and sends the return information to the target controller 10. N+5 represents the nonce plus 1, in other words, represents continuation of a return information in step S908.

Step S911: After receiving the running information, the target controller 10 enters a normal running state.

The target controller 10 encrypts, in the communication process between the target controller 10 and the auxiliary controller 20, content sent by the target controller 10 and the auxiliary controller 20, to ensure security and confidentiality of information transmission in the communication process. In addition, the nonce (Nonce) is used as protection for withstanding a replay attack.

Figure 10:
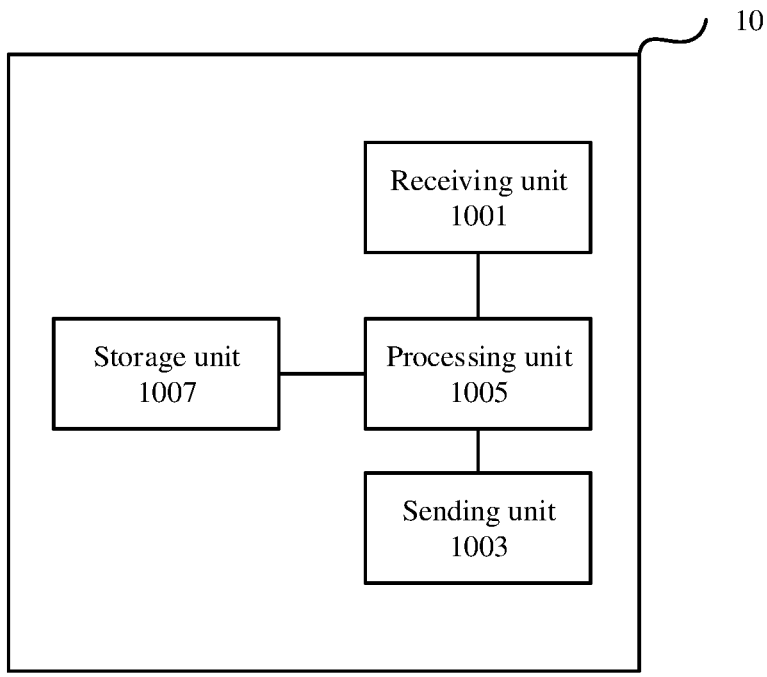
FIG. 10 is a schematic structural diagram of a target controller according to an embodiment.

FIG. 10 is a schematic structural diagram of a target controller 10 according to an embodiment. As shown in FIG. 10, a target controller 10 includes a receiving unit 1001, a sending unit 1003, a processing unit 1005, and a storage unit 1007.

The sending unit 1003 is configured to send startup information to an auxiliary controller 20. The startup information is a secure startup program that is used to trigger the auxiliary controller 20 to participate in authentication of a boot code control program and/or a system control program of the target controller 10. The auxiliary controller 20 includes a secure storage unit 21. The secure storage unit 21 has a tamper resistance function, and stores first public key information used to authenticate the target controller 10.

The receiving unit 1001 is configured to receive challenge information sent by the auxiliary controller 20.

The processing unit 1005 is configured to obtain response information based on the challenge information. The response information includes first information and second information. The first information is an image hash value of the boot code control program and/or an image hash value of the system control program, and the second information is a signature value of the first information.

The sending unit 1003 is further configured to send the response information to the auxiliary controller 20.

The receiving unit 1001 is further configured to receive running information sent by the auxiliary controller 20, and the running information is used to notify the target controller 10 whether the second information is verified. The running information is generated when the auxiliary controller 20 verifies the second information by using the first public key information and the first information.

The processing unit 1005 is further configured to run the boot code control program and/or the system control program based on the running information.

In a possible embodiment, the processing unit 1005 is configured to: after receiving first challenge information sent by the auxiliary controller 20, calculate a first image hash value and a first image signature value of an image of the boot code control program; and after receiving second challenge information sent by the auxiliary controller 20, calculate a second image hash value and a second image signature value of an image of the system control program.

In a possible embodiment, the first image hash value is obtained by hashing the image of the boot code control program and then raising the image to a $C^{th}$ power modulo N; the first image signature value is obtained by signing an image of the first image hash value and then raising the image to a $C^{th}$ power modulo N; the second image hash value is obtained by hashing the image of the system control program and then raising the image to a $C^{th}$ power modulo N; and the second image signature value is obtained by signing an image of the second image hash value and then raising the image to a $C^{th}$ power modulo N. C and N are positive integers.

In a possible embodiment, the storage unit 1007 stores second public key information that is compared with the first public key information.

In a possible embodiment, the storage unit 1007 is further configured to store a communication key. The processing unit 1005 is further configured to: in a process of communicating with the auxiliary controller 20, encrypt, by using the communication key, at least one of the startup information and the response information that are sent by the target controller 10, and decrypt, by using the communication key, at least one of the challenge information and the running information that are received by the target controller 10.

In a communication process between the target controller 10 and the auxiliary controller 20, after receiving the challenge information sent by the auxiliary controller 20, the target controller 10 sends the response information (response) to the auxiliary controller 20. The auxiliary controller 20 verifies source credibility and integrity of a boot program (Bootloader) and a system (System) in a startup process of the target controller 10 by using public key information, image hash values, and image signature values that are of the boot program and the system and that are in the response information, a challenge-response protocol, and the public key information that is stored in the secure storage unit 21. The target controller 10 can enter a normal working state only when the auxiliary controller 20 verifies the source credibility and the integrity of the boot program and the system of the target controller 10.

Figure 11:
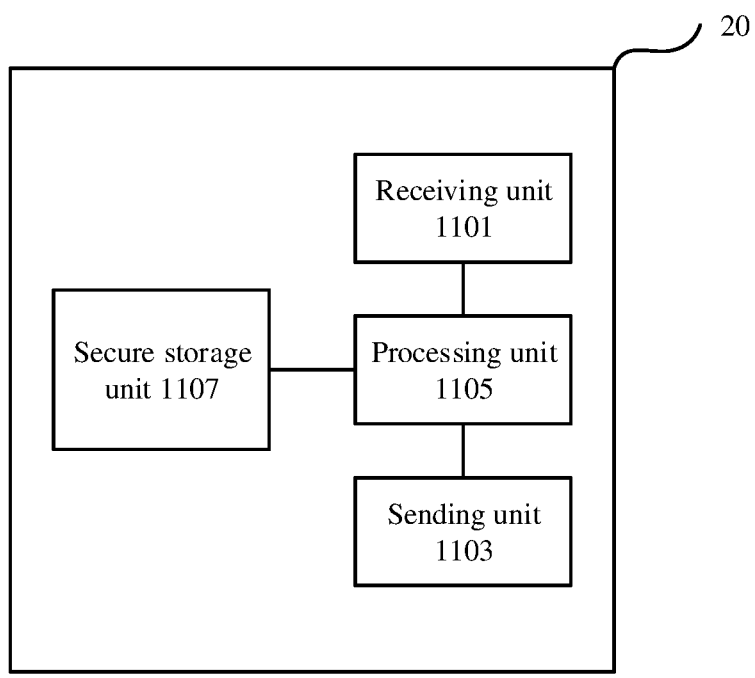
FIG. 11 is a schematic structural diagram of an auxiliary controller according to an embodiment.

FIG. 11 is a schematic structural diagram of an auxiliary controller 20 according to an embodiment. As shown in FIG. 11, an auxiliary controller 20 includes a receiving unit 1101, a sending unit 1103, a processing unit 1105, and a secure storage unit 1107.

The secure storage unit 1107 has a tamper resistance function, and stores first public key information used to authenticate the target controller 10.

The receiving unit 1101 is configured to receive startup information sent by the target controller 10.

The processing unit 1105 is configured to trigger authentication of a boot code control program and/or a system control program of the target controller 10 based on the startup information.

The sending unit 1103 is configured to send challenge information to the target controller 10. The challenge information is used to enable the target controller 10 to generate first information and second information. The first information is an image hash value of the boot code control program and/or an image hash value of the system control program, and the second information is a signature value of the first information.

The receiving unit 1101 is further configured to receive response information sent by the target controller 10. The response information includes the first information and the second information.

The processing unit 1105 is further configured to verify the second information by using the first public key information and the first information.

The sending unit 1103 is further configured to send running information to the target controller 10. The running information is used to notify the target controller 10 whether the second information is verified.

In a possible embodiment, the processing unit 1105 is configured to: compare a hash value obtained after a first image hash value is raised to a (first public key information)' power modulo N with a first image signature value, and send second challenge information to the target controller 10 after the hash value is the same as the first image signature value, where the first image hash value is obtained by calculating an image of the boot code control program, and the first image signature value is obtained by signing an image of the first image hash value; and compare a hash value obtained after a second image hash value is raised to a (first public key information)$^{th}$ power modulo N with a second image signature value, and send the running information to the target controller 10 after the hash value is the same as the second image signature value, where the second image hash value is obtained by calculating an image of the system control program, and the second image signature value is obtained by signing an image of the second image hash value. The response information includes the first image hash value, the first image signature value, the second image hash value, and the second image signature value.

In a possible embodiment, when the response information further includes second public key information, the processing unit 1105 is configured to: verify whether the first public key information is the same as the second public key information, and verify the second information when the first public key information is the same as the second public key information.

In a possible embodiment, the secure storage unit 1107 is further configured to store a communication key. The processing unit 1105 is further configured to: in a process of communicating with the target controller 10, encrypt, by using the communication key, at least one of the challenge information and the running information that are sent by the auxiliary controller 20, and decrypt, by using the communication key, at least one of the startup information and the response information that are received by the auxiliary controller 20.

In a communication process between the target controller 10 and the auxiliary controller 20, the auxiliary controller 20 sends the challenge information to the target controller 10, and after receiving the challenge information, the target controller 10 sends the response information (response) to the auxiliary controller 20. The auxiliary controller 20 verifies source credibility and integrity of a boot program (Bootloader) and a system (System) in a startup process of the target controller 10 by using public key information, image hash values, and image signature values that are of the boot program and the system and that are in the response information, a challenge-response protocol, and the public key information that is stored in the secure storage unit 1107. When verifying the source credibility and the integrity of the boot program and the system of the target controller 10, the auxiliary controller 20 sends the running information to the target controller 10.

Figure 12:
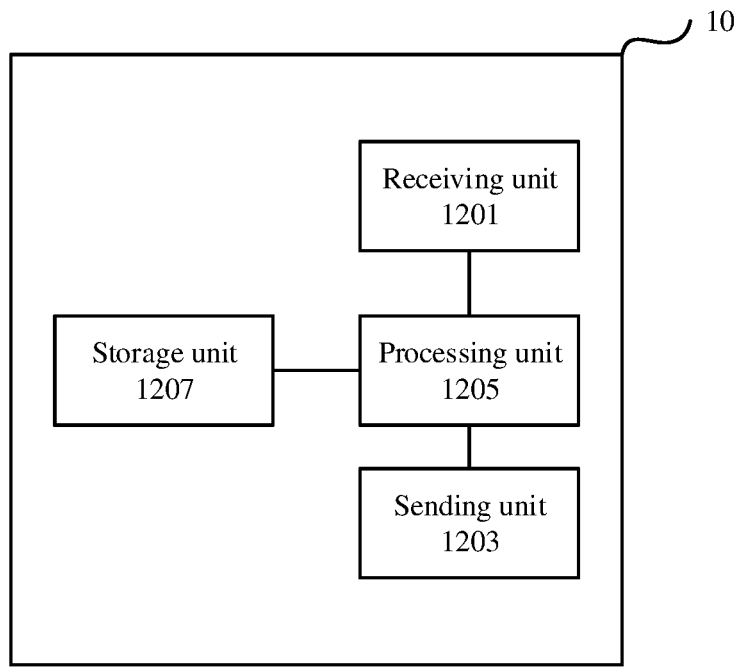
FIG. 12 is a schematic structural diagram of another target controller according to an embodiment.

FIG. 12 is a schematic structural diagram of another target controller 10 according to an embodiment. As shown in FIG. 12, a target controller 10 includes a receiving unit 1201, a sending unit 1203, a processing unit 1205, and a storage unit 1207.

The sending unit 1203 is configured to send startup information to an auxiliary controller 20. The startup information is a secure startup program that is used to trigger the auxiliary controller 20 to participate in authentication of a boot code control program and/or a system control program of the target controller 10. The auxiliary controller 20 generates at least two pieces of challenge information. The auxiliary controller 20 includes a secure storage unit 1107. The secure storage unit 1107 has a tamper resistance function, and stores first key information, a boot code control program and/or a system control program, and the at least two pieces of challenge information.

The receiving unit 1201 is configured to receive challenge information sent by the auxiliary controller 20.

The processing unit 1205 is configured to generate response information based on the challenge information. The response information is an image hash value of the boot code control program and/or an image hash value of the system control program.

The sending unit 1203 is further configured to send response information to the auxiliary controller 20.

The receiving unit 1201 is further configured to receive running information sent by the auxiliary controller 20. The running information is generated when the auxiliary controller 20 verifies the response information by using the first key information and an original hash value.

The processing unit 1205 is further configured to run the boot code control program and/or the system control program based on the running information.

In a possible embodiment, the processing unit 1205 is configured to: after receiving first challenge information selected, for sending, from the at least two pieces of challenge information generated by the auxiliary controller 20, hash the first challenge information and an image of the boot code control program to obtain a first image hash value; and after receiving second challenge information selected, for sending, from the at least two pieces of challenge information generated by the auxiliary controller 20, hash the second challenge information and an image of the system control program to obtain a second image hash value.

In a possible embodiment, the storage unit 1207 is configured to store a communication key. The processing unit 1205 is further configured to: in a process of communicating with the auxiliary controller 20, encrypt, by using the communication key, at least one of the startup information and the response information that are sent by the target controller 10, and decrypt, by using the communication key, at least one of the challenge information and the running information that are received by the target controller 10.

In a communication process between the target controller 10 and the auxiliary controller 20, after receiving one piece of challenge information selected from a plurality of pieces of challenge information generated and sent by the auxiliary controller 20, the target controller 10 sends the response information (response) to the auxiliary controller 20. The auxiliary controller 20 verifies source credibility and integrity of a boot program (Bootloader) and a system (System) in a startup process of the target controller 10 by using image hash values that are of the boot program and the system and that are in the response information, a challenge-response protocol, and the key information that is stored in the secure storage unit 1107. The target controller 10 can enter a normal working state only when the auxiliary controller 20 verifies the source credibility and the integrity of the boot program and the system of the target controller 10.

Figure 13:
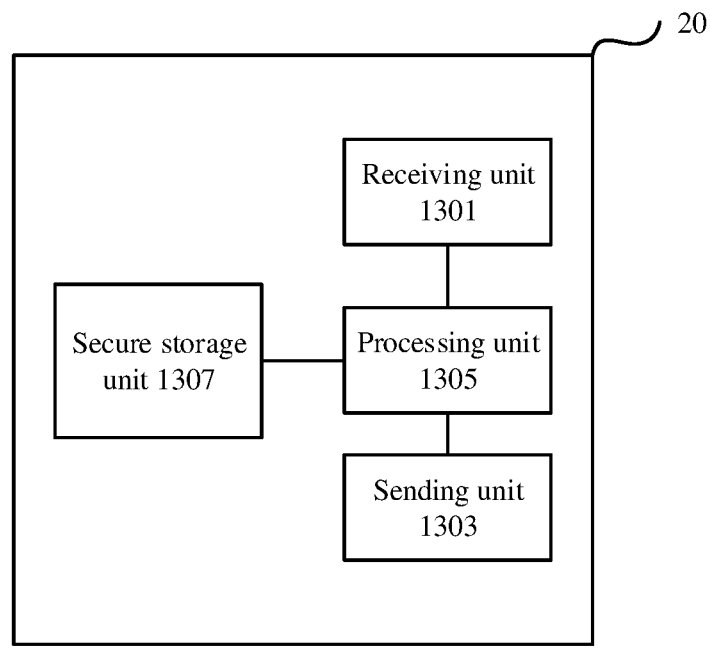
FIG. 13 is a schematic structural diagram of another auxiliary controller according to an embodiment.

FIG. 13 is a schematic structural diagram of another auxiliary controller 20 according to an embodiment. As shown in FIG. 13, an auxiliary controller 20 includes a receiving unit 1301, a sending unit 1303, a processing unit 1305, and a secure storage unit 1307.

The secure storage unit 1307 has a tamper resistance function, and stores first key information, a boot code control program and/or a system control program, and at least two pieces of challenge information.

The receiving unit 1301 is configured to receive startup information sent by the target controller 10.

The processing unit 1305 is configured to trigger, based on the startup information, a secure startup program that participates in authentication of a boot code control program and/or a system control program of the target controller 10.

The sending unit 1303 is configured to send challenge information to the target controller 10. The challenge information is used to enable the target controller 10 to obtain response information. The response information is an image hash value of the boot code control program and/or an image hash value of the system control program.

The receiving unit 1301 is further configured to receive the response information sent by the target controller 10.

The processing unit 1305 is further configured to verify the response information by using the first key information and an original hash value.

The sending unit 1303 is further configured to send running information to the target controller. The running information is used to run the boot code control program and/or the system control program.

At least two original hash values stored in the secure storage unit 1307 for: separately hashing at least two pieces of challenge information and an image of the boot code control program, and then performing hash with the first key information to obtain original hash values of at least two boot code control programs; and separately hashing the at least two pieces of challenge information and an image of the system control program, and then performing hash with the first key information to obtain original hash values of at least two system control programs.

In a possible embodiment, the processing unit 1305 is configured to: compare a hash value obtained after hashing the first key information and the first image hash value with an original hash value of the boot code control program corresponding to the first challenge information, and send second challenge information to the target controller 10 after the hash value is the same as the original hash value, where the first image hash value is obtained by hashing the first challenge information and the image of the boot code control program; and compare a hash value obtained after hashing the first key information and the second image hash value with an original hash value of the system control program corresponding to the second challenge information, and send the running information to the target controller 10 after the hash value is the same as the original hash value, where the second image hash value is obtained by hashing the second challenge information and the image of the system control program. The at least two pieces of challenge information include the first challenge information and the second challenge information.

In a possible embodiment, the secure storage unit 1307 is further configured to store a communication key. The processing unit 1305 is further configured to: in a process of communicating with the target controller 10, encrypt, by using the communication key, at least one of the challenge information and the running information that are sent by the auxiliary controller 20, and decrypt, by using the communication key, at least one of the startup information and the response information that are received by the auxiliary controller 20.

In a communication process between the target controller 10 and the auxiliary controller 20, the auxiliary controller 20 selects one piece of challenge information from a plurality of pieces of generated challenge information and sends the challenge information to the target controller 10, and after receiving the challenge information, the target controller 10 sends the response information (response) to the auxiliary controller 20. The auxiliary controller 20 verifies source credibility and integrity of a boot program (Bootloader) and a system (System) in a startup process of the target controller 10 by using image hash values that are of the boot program and the system and that are in the response information, a challenge-response protocol, and the key information that is stored in the secure storage unit 1307. When verifying the source credibility and the integrity of the boot program and the system of the target controller, the auxiliary controller 20 sends the running information to the target controller 10.

In this embodiment, both the auxiliary controller 20 and the secure storage unit 1307 have a function of verifying security of another controller. The auxiliary controller 20 may perform security verification on the another controller. If the secure storage unit 1307 has been described above, all functions of the auxiliary controller 20 mentioned above are performed by the secure storage unit 1307.

Figure 14:
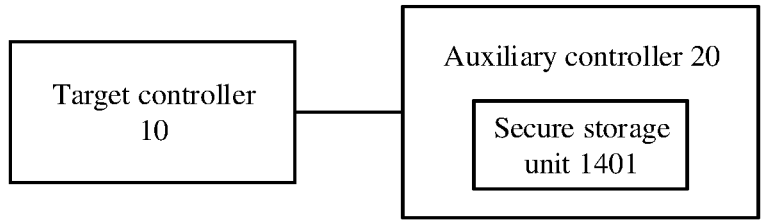
FIG. 14 is a schematic structural diagram of a control system according to an embodiment.

FIG. 14 is a schematic structural diagram of a control system according to an embodiment. As shown in FIG. 14, a control system 14 includes a target controller 10 and an auxiliary controller 20. The auxiliary controller 20 includes a secure storage unit 1401. The secure storage unit 1401 stores public key information used to authenticate the target controller 10.

In a communication process between the target controller 10 and the auxiliary controller 20, the auxiliary controller 20 sends challenge information to the target controller 10, and the target controller 10 receives challenge information sent by the auxiliary controller 20, and sends response information (response) to the auxiliary controller 20. The auxiliary controller 20 verifies source credibility and integrity of a boot program (Bootloader) and a system (System) in a startup process of the target controller 10 by using public key information, image hash values, and image signature values that are of the boot program and the system and that are in the response information, a challenge-response protocol, and the public key information that is stored in the secure storage unit 1401. When the auxiliary controller 20 verifies the source credibility and the integrity of the boot program and the system in the startup process of the target controller 10, the auxiliary controller 20 sends running information to the target controller 10, and the target controller 10 can enter a normal working state based on the received running information.

Figure 15:
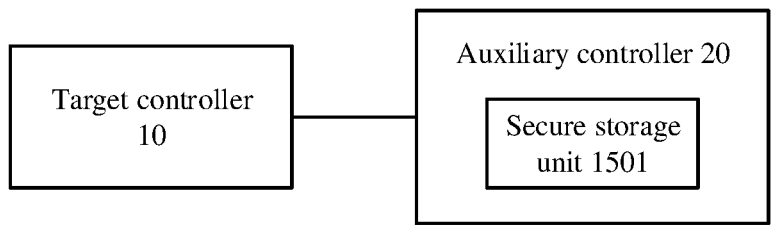
FIG. 15 is a schematic structural diagram of another control system according to an embodiment.

FIG. 15 is a schematic structural diagram of another control system according to an embodiment. As shown in FIG. 15, a control system 15 includes a target controller 10 and an auxiliary controller 20. The auxiliary controller 20 includes a secure storage unit 1501. The secure storage unit 1501 stores at least two pieces of challenge information generated by the auxiliary controller 20, first public key information of the target controller 10, a boot code control program and/or a system control program of the target controller 10, and at least two pieces of challenge information.

At least two original hash values stored in the secure storage unit 1501 for separately hashing the at least two pieces of challenge information and an image of the boot code control program, and then performing hash with the first public key information to obtain original hash values of at least two boot code control programs; and separately hashing the at least two pieces of challenge information and an image of the system control program, and then performing hash with the first public key information to obtain original hash values of at least two system control programs.

In a communication process between the target controller 10 and the auxiliary controller 20, the auxiliary controller 20 selects one piece of challenge information from a plurality of pieces of generated challenge information and sends the challenge information to the target controller 10, and after receiving the challenge information sent by the auxiliary controller 20, the target controller 10 sends response information (response) to the auxiliary controller 20. The auxiliary controller 20 verifies source credibility and integrity of a boot program (Bootloader) and a system (System) in a startup process of the target controller 10 by using image hash values that are of the boot program and the system and that are in the response information, a challenge-response protocol, and the public key information that is stored in the secure storage unit 1501. When the auxiliary controller 20 verifies the source credibility and the integrity of the boot program and the system in the startup process of the target controller 10, the auxiliary controller 20 sends running information to the target controller 10, and the target controller 10 can enter a normal working state based on the received running information.

A vehicle-mounted device may include the control system shown in FIG. 14. A target controller 10 is connected to an auxiliary controller 20 by using an entity bus, to implement communication between the target controller 10 and the auxiliary controller 20.

Another vehicle-mounted device may include the control system shown in FIG. 15. A target controller 10 is connected to an auxiliary controller 20 by using an entity bus, to implement communication between the target controller 10 and the auxiliary controller 20.

Figure 16:
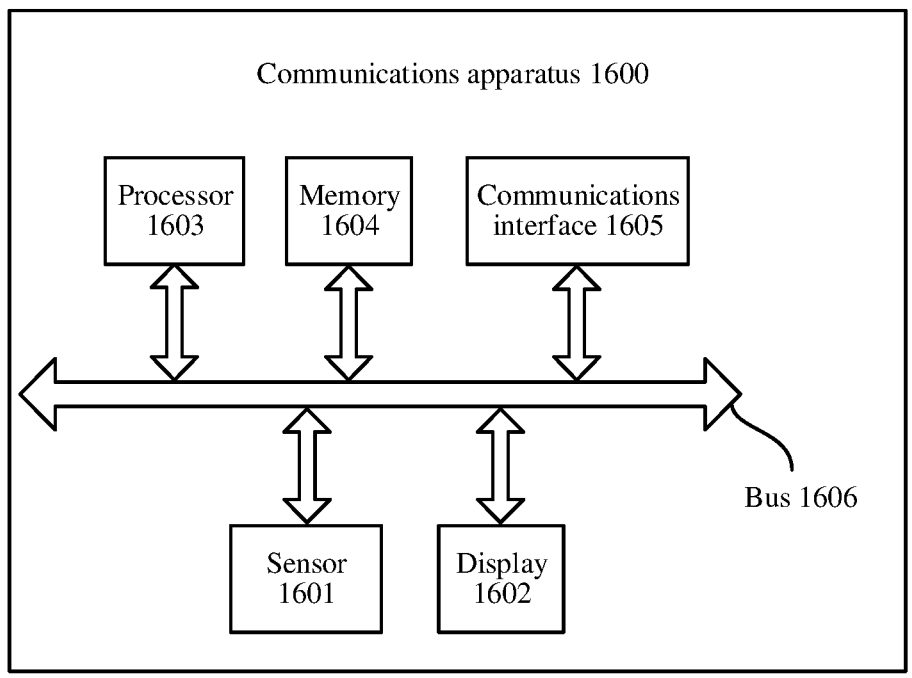
FIG. 16 is a schematic structural diagram of a communications apparatus according to an embodiment.

FIG. 16 is a schematic structural diagram of a communications apparatus according to an embodiment. A communications apparatus 1600 shown in FIG. 16 may include a sensor 1601, a display 1602, a processor 1603, a memory 1604, a communications interface 1605, and a bus 1606. The processor 1603, the memory 1604, and the communications interface 1605 in the communications apparatus may establish a communication connection by using the bus 1606.

The sensor 1601 is configured to send startup information and response information and obtain challenge information and running information that are sent by an auxiliary controller 20.

The display 1602 is configured to display processed data.

The processor 1603 may be a central processing unit (CPU).

The memory 1604 may include a volatile memory, such as a random access memory (RAM); or the memory 1604 may include a non-volatile memory, such as a read-only memory (ROM), a flash memory, a hard disk drive (HDD), or a solid-state drive (SSD); or the memory 1604 may include a combination of the foregoing types of memories.

All the secure startup methods provided in the foregoing embodiments are performed by the processor 1603. Data such as a first program, second public key information, first information, second information, and a communication key are stored in the memory 1604. In addition, the memory 1604 is further configured to store a corresponding program instruction and the like that are executed by the processor 1603 to implement the secure startup method described in the foregoing embodiment.

Figure 17:
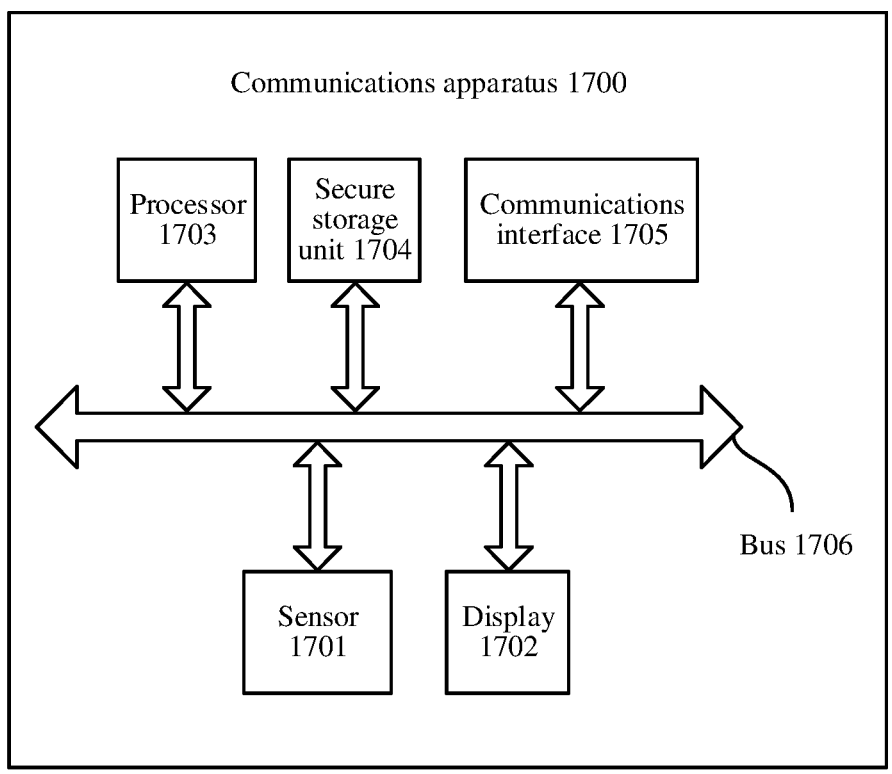
FIG. 17 is a schematic structural diagram of another communications apparatus according to an embodiment.

FIG. 17 is a schematic structural diagram of another communications apparatus according to an embodiment. A communications apparatus 1700 shown in FIG. 17 may include a sensor 1701, a display 1702, a processor 1703, a secure storage unit 1704, a communications interface 1705, and a bus 1706. The processor 1703, the secure storage unit 1704, and the communications interface 1705 in the communications apparatus 1700 may establish a communication connection by using the bus 1706.

The sensor 1701 is configured to send challenge information and running information and obtain startup information and response information that are sent by a target controller 10.

The display 1702 is configured to display processed data.

The processor 1703 may be a central processing unit (CPU).

The secure storage unit 1704 may include a volatile memory, such as a random access memory (RAM); or the secure storage unit 1704 may include a non-volatile memory, such as a read-only memory (ROM), a flash memory, a hard disk drive (HDD), or a solid-state drive (SSD); or the secure storage unit 1704 may include a combination of the foregoing types of memories. A prominent feature of the secure storage unit 1704 is that the secure storage unit 1704 has a tamper resistance function.

All the secure startup methods provided in the foregoing embodiments are performed by the processor 1703. Data such as first public key information, a first program of the target controller 10, and a communication key are stored in the secure storage unit 1704. In addition, the secure storage unit 1704 is further configured to store a corresponding program instruction and the like that are executed by the processor 1703 to implement the secure startup method described in the foregoing embodiment.

A non-transitory machine-readable storage medium may be configured to store instructions. When the instructions are executed, the method described in FIG. 2 or FIG. 6 is implemented.

Another non-transitory machine-readable storage medium may be configured to store instructions. When the instructions are executed, the method described in FIG. 3 or FIG. 7 is implemented.

A person of ordinary skill in the art may be aware that, in combination with the examples described in the embodiments, units and algorithm steps may be implemented by electronic hardware or a combination of computer software and electronic hardware. Whether the functions are performed by hardware or software depends design constraint conditions of the solutions. A person skilled in the art may use different methods to implement the described functions, but it should not be considered that the implementation goes beyond the scope of the embodiments.

In addition, aspects or features in the embodiments may be implemented as a method, an apparatus, or a product that uses standard programming and/or engineering technologies. The term "product" covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD), or a digital versatile disc (DVD)), a smart card, and a flash memory component (for example, an erasable programmable read-only memory (EPROM), a card, a stick, or a key drive). In addition, various storage media described may indicate one or more devices and/or other machine-readable media that are configured to store information. The term "machine-readable media" may include but is not limited to a radio channel, and various other media that can store, contain, and/or carry instructions and/or data.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD), or the like.

It should be understood that sequence numbers of the foregoing processes do not mean execution sequences in various embodiments. The execution sequences of the processes should be determined according to functions and internal logic of the processes, and should not be construed as any limitation on the implementation processes of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When the functions are implemented in the form of a software functional unit and sold or used as an independent product, the functions may be stored in a computer-readable storage medium. Based on such an understanding, some of the solutions may be implemented in a form of a software product. The software product is stored in a storage medium, and includes several instructions for instructing a computer device (which may be a personal computer, a server, or a network device) to perform all or some of the steps of the methods described in the embodiments. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely implementations, but are not intended to limit the protection scope. Any variation or replacement readily figured out by a person skilled shall fall within the protection scope of the embodiments.

What is claimed is:

1. A method performed by a target controller mounted in a vehicle, wherein the method comprises:
    sending startup information to an auxiliary controller, wherein the auxiliary controller comprises a secure storage unit that stores first public key information, the secure storage unit has a tamper resistance function with a hardware root of trust, the first public key information is used to authenticate the target controller, and the startup information is used to trigger the auxiliary controller to authenticate a first program of the target controller;
    receiving challenge information from the auxiliary controller;
    obtaining response information based on the challenge information, wherein the response information comprises first information and second information, the first information comprises a hash value of an image of a boot code control program and a hash value of an image of a system control program, and the second information is a signature value of the first information;
    receiving running information for the boot code control program and the system control program from the auxiliary controller, wherein the running information is used to notify the target controller whether the second information is verified;
    sending the response information to the auxiliary controller;
    starting the target controller securely based on the hardware root of trust through cooperation between the auxiliary controller and the target controller;
    obtaining an image hash value of the first program based on C;
    raising the image hash value to a $C^{th}$ power modulo N to obtain the first information;
    raising a signature value of the image hash value of the first program to a $C^{th}$ power modulo N to obtain the second information, wherein C and N are positive integers, C is the challenge information; and
    storing the signature value of the image hash value of the first program in the target controller.

2. The method according to claim 1, further comprising:
    running the first program, wherein the first program comprises at least one of the boot code control program and the system control program.

3. The method according to claim 1, further comprising:
    in a process of communicating with the auxiliary controller, encrypting, by using a communication key stored in the target controller, at least one of the startup information and the response information that are sent by the target controller; and
    decrypting, by using the communication key, at least one of the challenge information and the running information that are received by the target controller.

4. A method performed by an auxiliary controller, wherein the auxiliary controller comprises a secure storage unit having a tamper resistance function with a hardware root of trust that stores first public key information used to authenticate a target controller mounted in the vehicle, the method comprising:
    receiving startup information from the target controller, wherein the startup information is used to trigger the auxiliary controller to authenticate a first program of the target controller;
    sending challenge information to the target controller;
    receiving response information from the target controller, wherein the response information comprises first information and second information, the first information comprises a hash value of an image of a boot code control program and a hash value of an image of a system control program, and the second information is a signature value of the first information;
    obtaining a hash value after raising the first information to a (first public key information)$^{th}$ power modulo N;
    sending running information for the boot code control program and the system control program to the target controller when the hash value is the same as the second information, wherein the running information is used to notify the target controller whether the second information is verified; and
    starting the target controller securely based on the hardware root of trust through cooperation between the auxiliary controller and the target controller.

5. The method according to claim 4, wherein the response information further comprises second public key information, the method further comprising:
    verifying whether the first public key information is the same as the second public key information; and
    verifying the second information when the first public key information is the same as the second public key information.

6. The method according to claim 4, further comprising:
    storing a communication key in the secure storage unit;
    in a process of communicating with the target controller, encrypting, by using the communication key, at least one of the challenge information and the running information that are sent by the auxiliary controller; and
    decrypting, by using the communication key, at least one of the startup information and the response information that are received by the auxiliary controller.

7. A communications apparatus, comprising:
    a processor; and
    a non-transitory computer-readable storage medium coupled to the processor and storing programming instructions for execution by the processor, wherein the programming instructions instruct the processor to:

send startup information to an auxiliary controller, wherein the auxiliary controller comprises a secure storage unit that stores first public key information, the secure storage unit has a tamper resistance function with a hardware root of trust, the first public key information is used to authenticate the communications apparatus, and the startup information is used to trigger the auxiliary controller to authenticate a first program of the communications apparatus;

receive challenge information from the auxiliary controller, and obtaining response information based on the challenge information, wherein the response information comprises first information and second information, wherein the first information comprises a hash value of an image of a boot code control program and a hash value of an image of a system control program, and the second information is a signature value of the first information;

receive running information for the boot code control program and the system control program from the auxiliary controller, wherein the running information is used to notify the communication apparatus whether the second information is verified;

send the response information to the auxiliary controller;

start a target controller mounted in a vehicle securely based on the hardware root of trust through cooperation between the auxiliary controller and the target controller;

obtaining an image hash value of the first program based on C;

raising the image hash value to a $C^{th}$ power modulo N to obtain the first information;

raising a signature value of the image hash value of the first program to a $C^{th}$ power modulo N to obtain the second information, wherein C and N are positive integers, C is the challenge information; and storing the signature value of the image hash value of the first program in the target controller.

8. The communication apparatus according to claim 7, wherein the programming instructions further instruct the processor to:
run the first program, wherein the first program comprises at least one of the boot code control program and the system control program.

9. The communication apparatus according to claim 7, wherein the programming instructions instruct the processor to:
in a process of communicating with the auxiliary controller, encrypt, by using a communication key stored in the communication apparatus, at least one of the startup information and the response information that are sent by the communication apparatus; and
decrypt, by using the communication key, at least one of the challenge information and the running information that are received by the communication apparatus.

10. A communications apparatus, comprising:
a secure storage unit that stores first public key information, wherein the secure storage unit has a tamper resistance function with a hardware root of trust, and the first public key information is used to authenticate a target controller mounted in a vehicle;
a processor; and
a non-transitory computer-readable storage medium coupled to the processor and storing programming instructions for execution by the processor, wherein the programming instructions instruct the processor to:
receive startup information from the target controller, wherein the startup information is used to trigger the communications apparatus to authenticate a first program of the target controller;
send challenge information to the target controller;
receive response information from the target controller, wherein the response information comprises first information and second information, wherein the first information comprises a hash value of an image of a boot code control program and a hash value of an image of a system control program, and the second information is a signature value of the first information;
obtaining a hash value after raising the first information to a (first public key information)$^{th}$ power modulo N;
send running information for the boot code control program and the system control program to the target controller when the hash value is the same as the second information, wherein the running information is used to notify the target controller whether the second information is verified; and
start the target controller securely based on the hardware root of trust through cooperation between the auxiliary controller and the target controller.

11. The communication apparatus according to claim 10, wherein the response information further comprises second public key information, and the programming instructions further instruct the processor to:
verify whether the first public key information is the same as the second public key information; and
verify the second information when the first public key information is the same as the second public key information.

12. The communication apparatus according to claim 10, wherein the secure storage unit further stores a communication key, and the programming instructions further instruct the processor to:
in a process of communicating with the target controller, encrypt, by using the communication key, at least one of the challenge information and the running information that are sent by the auxiliary controller; and
decrypt, by using the communication key, at least one of the startup information and the response information that are received by the communication apparatus.

* * * * *